(12) United States Patent
Matsui

(10) Patent No.: US 6,991,336 B2
(45) Date of Patent: Jan. 31, 2006

(54) ILLUMINATION APPARATUS AND PROJECTOR DISPLAY APPARATUS

(75) Inventor: Shinzo Matsui, Kitatsuru-gun (JP)

(73) Assignee: Olympus Corporation, Tokyo (JP)

( * ) Notice: Subject to any disclaimer, the term of this patent is extended or adjusted under 35 U.S.C. 154(b) by 21 days.

(21) Appl. No.: 10/635,192

(22) Filed: Aug. 6, 2003

(65) Prior Publication Data

US 2004/0125344 A1 Jul. 1, 2004

(30) Foreign Application Priority Data

Aug. 7, 2002 (JP) ..................................... 2002-230207

(51) Int. Cl.
*G03B 21/00* (2006.01)
*G03B 21/20* (2006.01)
*G03B 21/26* (2006.01)
*H04N 9/12* (2006.01)
*H04N 5/74* (2006.01)

(52) U.S. Cl. ............................. 353/94; 353/31; 353/85; 348/743; 348/759; 345/36; 345/45; 345/76

(58) Field of Classification Search .................. 353/31, 353/33, 34, 37, 81, 85, 94, 122; 348/743, 348/759, 771, 800, 801; 349/5, 7, 8, 9, 61, 349/62, 69, 70; 385/901; 345/36, 39, 44, 345/45, 46, 76, 82, 83; 362/551, 555, 231, 362/245, 247, 800

See application file for complete search history.

(56) References Cited

U.S. PATENT DOCUMENTS

| | | | |
|---|---|---|---|
| 6,129,437 A | 10/2000 | Koga et al. | ................... 353/98 |
| 6,224,216 B1 * | 5/2001 | Parker et al. | ................... 353/31 |
| 6,227,669 B1 | 5/2001 | Tiao et al. | .................... 353/31 |
| 6,318,863 B1 | 11/2001 | Tiao et al. | .................... 353/31 |
| 6,860,606 B2 * | 3/2005 | Childers et al. | ............. 353/31 |
| 2002/0080834 A1 | 6/2002 | Kusunose | .................... 372/25 |
| 2003/0076057 A1 | 4/2003 | Fleury | ........................ 315/291 |
| 2004/0207816 A1 * | 10/2004 | Omoda et al. | ................ 353/31 |
| 2005/0062937 A1 * | 3/2005 | Imade et al. | .................. 353/31 |

FOREIGN PATENT DOCUMENTS

| | | |
|---|---|---|
| DE | 44 24 887 A1 | 1/1995 |
| EP | 1 372 028 A2 | 12/2003 |
| EP | 1 508 740 A1 | 2/2005 |
| FR | 2 800 500 | 5/2001 |
| JP | 10-293233 | 11/1998 |
| JP | 10-333588 | 12/1998 |
| JP | 11032278 | 2/1999 |
| JP | 2000-294491 | 10/2000 |
| WO | 03/063477 | 7/2003 |

* cited by examiner

*Primary Examiner*—Judy Nguyen
*Assistant Examiner*—Melissa J Koval
(74) *Attorney, Agent, or Firm*—Volpe and Koenig, P.C.

(57) ABSTRACT

An illumination apparatus comprise a light control member configured to perform changing the path of light from light emitters to be directed to an illuminated area and/or moving of the light emitters, a movement unit configured to allow the light control member to operate, and a light selector control unit configured to control the movement unit and/or a lighting unit, which is configured to cause the light emitters to emit light so that the intensities of light emitted by them can be adjusted, so as to select light to be directed to the illuminated area from light of the emitters. The light selector control unit controls the lighting unit to cause an emitter to emit light when it is positioned in the vicinity of a light concentration area of an optical system by the operation of the light control member.

25 Claims, 20 Drawing Sheets

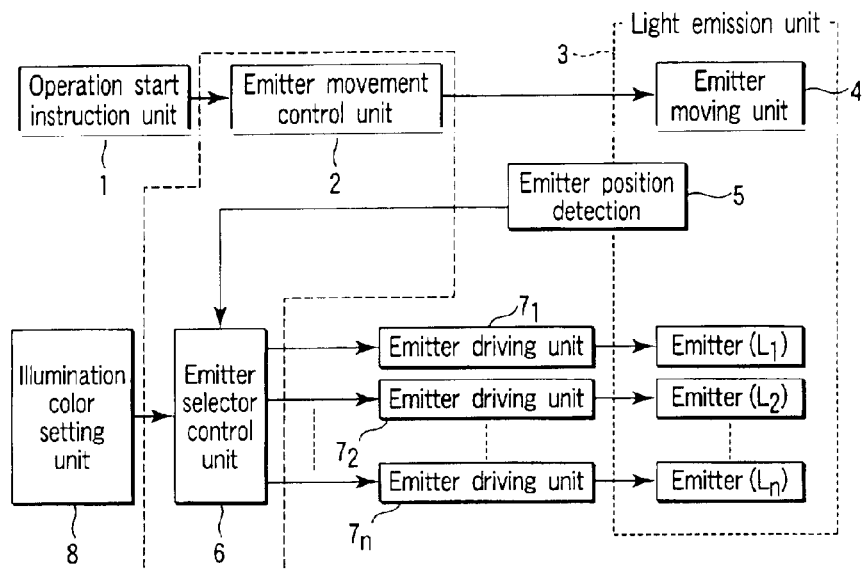
FIG. 1
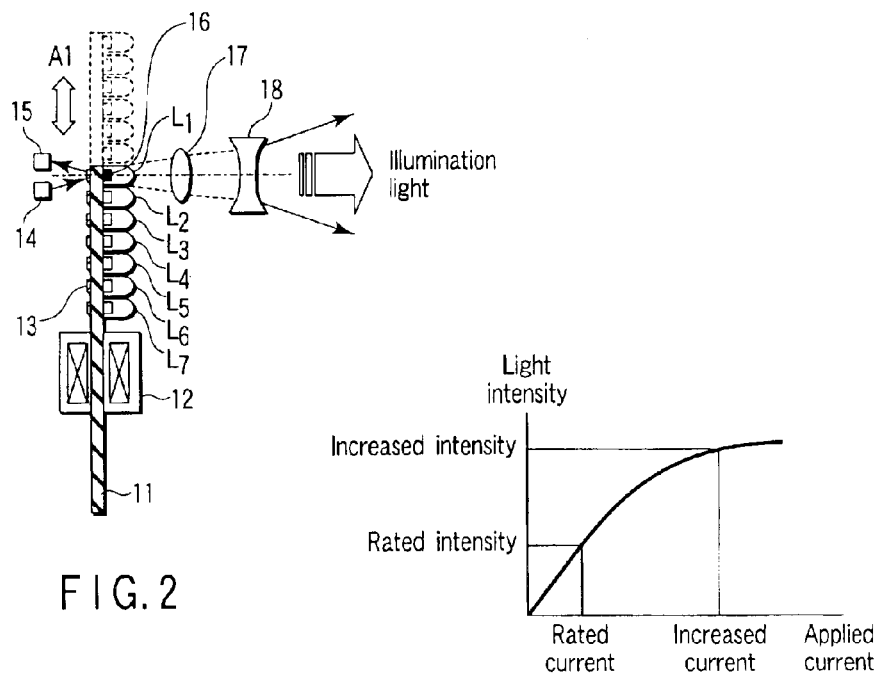
FIG. 2
FIG. 3

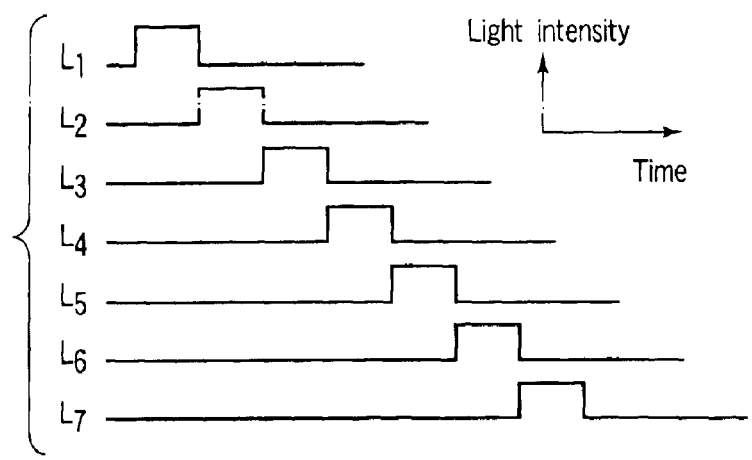
F I G. 4
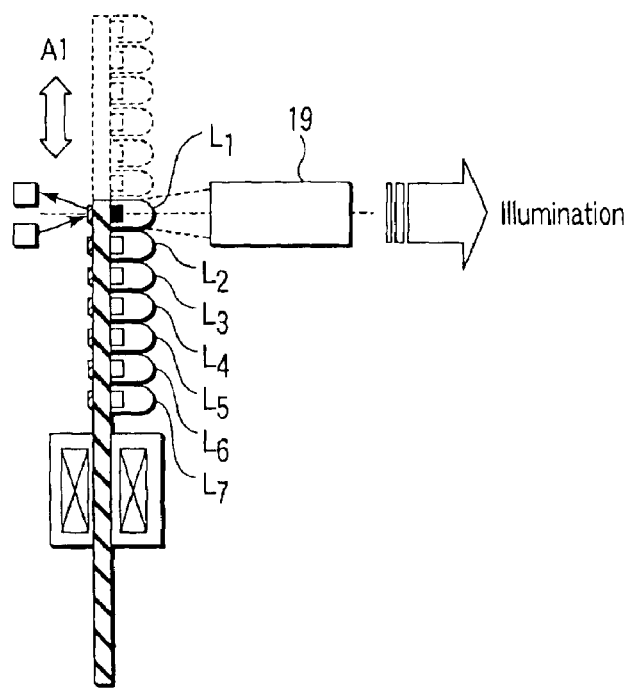
F I G. 5

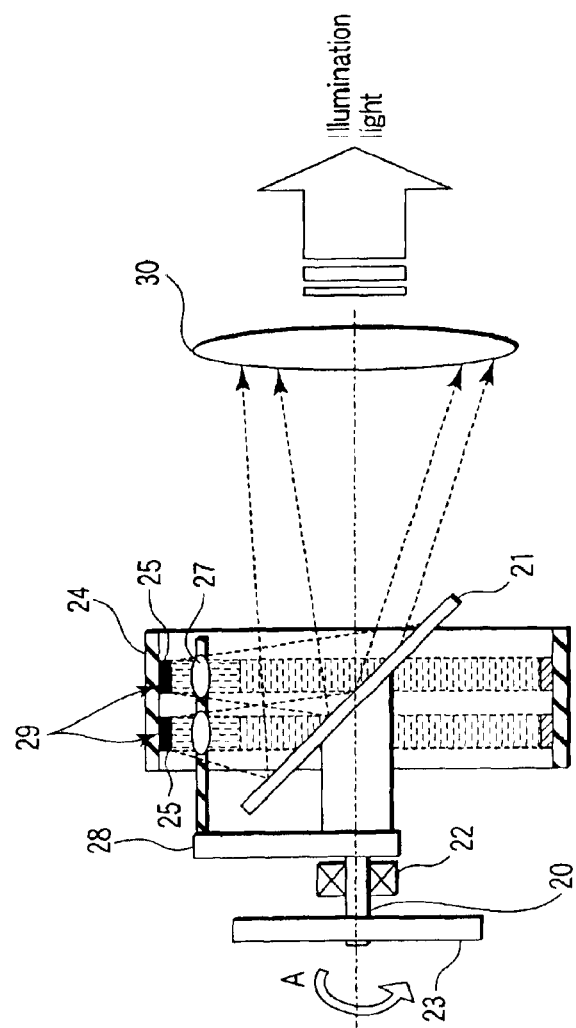
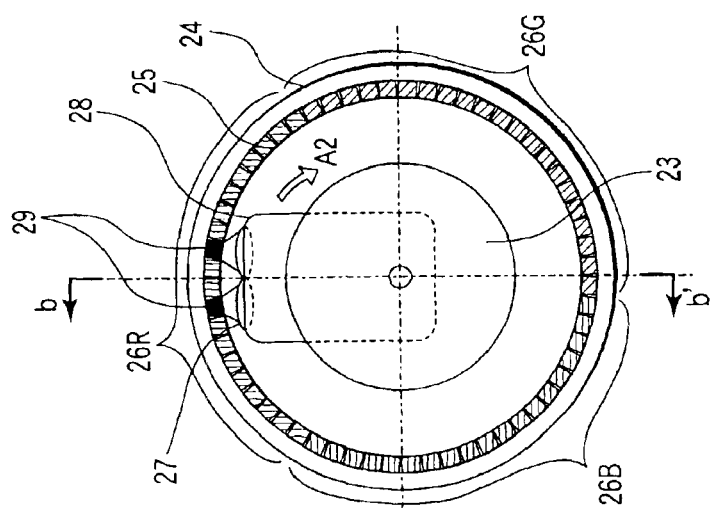
FIG. 6B
FIG. 6A $Dp = 2 \times Ds$
$Do = Ds$

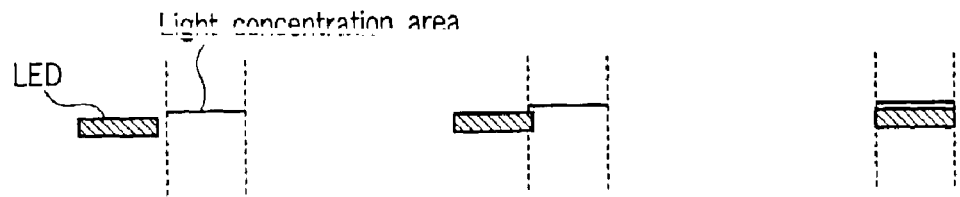
| FIG. 12A | FIG. 12B | FIG. 12C |
| FIG. 12D | FIG. 12E |
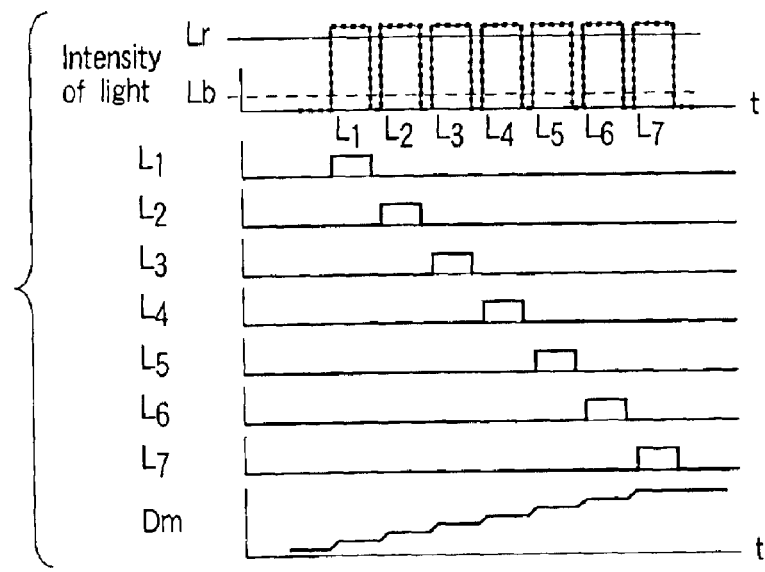
FIG. 13

$Dp \leq 2 \times Ds$
$Do < Ds$

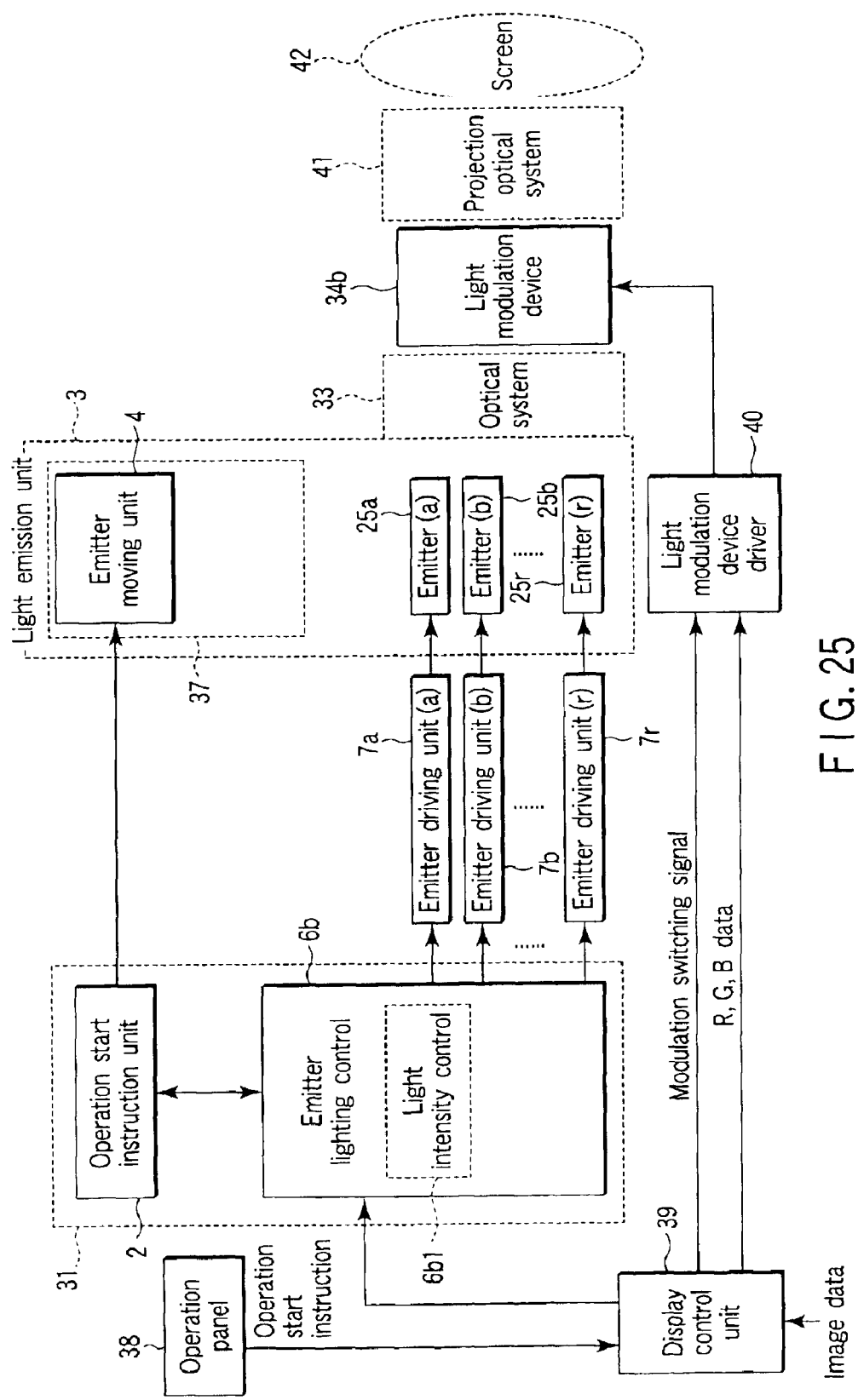
F I G. 25

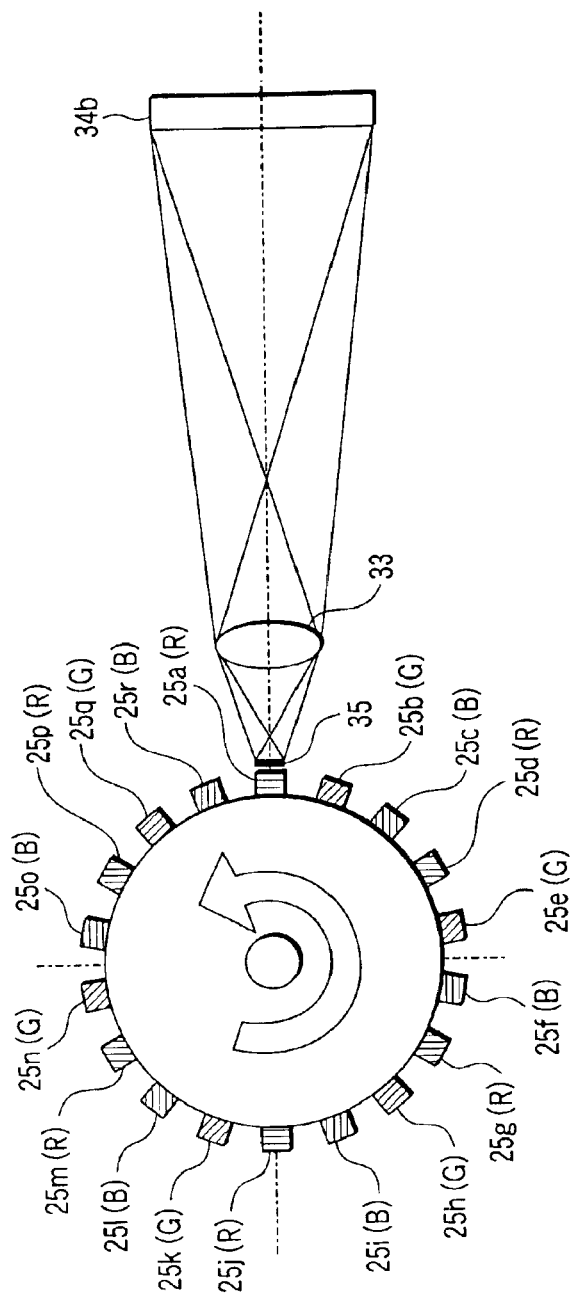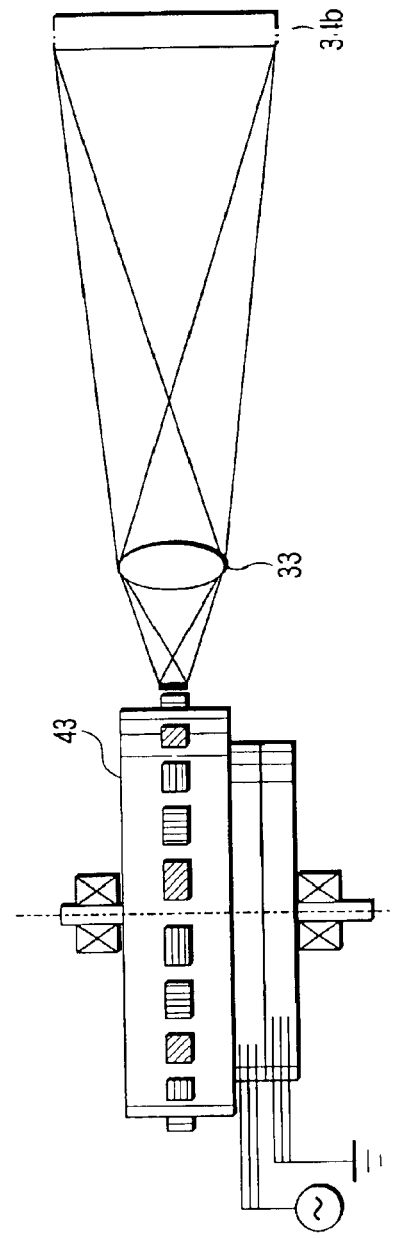
FIG. 26A
FIG. 26B

ILLUMINATION APPARATUS AND PROJECTOR DISPLAY APPARATUS

CROSS-REFERENCE TO RELATED APPLICATIONS

This application is based upon and claims the benefit of priority from the prior Japanese Patent Application No. 2002-230207, filed Aug. 7, 2002, the entire contents of which are incorporated herein by reference.

BACKGROUND OF THE INVENTION

1. Field of the Invention

This invention relates to an illumination apparatus which has the high condenser capability and the high brightness and is possible to miniaturize the whole illumination apparatus, and to projector display apparatus using such an illumination apparatus.

2. Description of the Related Art

Examples of a condenser illumination apparatus which illuminates a specified portion with high efficiency have heretofore been known such as a car headlight, stand illumination, spot light, flashlight, and illumination unit for a data projector. In this condenser illumination apparatus, light from a light emitting source closer to a point source is reflected by a reflection unit whose reflection shape is devised, directivity of a light flux of the reflected light is enhanced by an optical lens, and the reflected light is usually used to effectively perform condenser illumination.

In the same manner as in conventional illumination, even in these condenser illumination apparatus, there is much demand for obtaining a brighter illumination light without excessively enlarging a size of the apparatus. In order to obtain the brighter illumination light, the size of the condenser illumination apparatus tends to increase. Particularly to enlarge an applied power of the light emitting source, thereby to increase a quantity of output light, and additionally to enhance a condenser capability, the reflection unit or optical lens is applied which is relatively enlarged with respect to the light emitting source. Therefore, to obtain brightness with good condenser efficiency, the size of the illumination apparatus has to be necessarily enlarged with respect to the light emitting source. In other words, with a small-sized light emitting source which has a high output and which is close to the point source, it is also possible to miniaturize the whole illumination apparatus. From this demand, the miniaturization of the light emitting source of a conventional system has also been advanced, and particularly a small-sized light emitting source by a discharge type from which the high output is possible has been effective means at present. Additionally, even with the light emitting source of the small-sized discharge type, the driving by a high-voltage power source is required in which it is difficult to reduce a circuit scale. There are other many problems with respect to the miniaturization of the total illumination apparatus. It is said that the miniaturization has already substantially approached limitation.

On the other hand, LED is remarkably noted as a next-generation small-sized light emitting source nowadays. The LED has heretofore had advantages such as small size, high durability, and long life, but has been mainly used as indicator illumination for various instruments or a confirmation lamp of a control stage because of restrictions of emission efficiency and emission output. However, in recent years, the emission efficiency has been rapidly improved, and it is said to be a matter of time before the emission efficiency exceeds that of a high-pressure mercury lamp or fluorescent lamp of the discharge type assumed to have heretofore had highest efficiency. By appearance of the high-efficiency high-brightness LED, the high-output light emitting source by the LED has rapidly been brought into a practical use. In recent years, in addition to red and green, a blue LED has entered a practical-use stage, and this also accelerates the application of the light emitting source. In actual, a plurality of high-efficiency high-brightness LED are used to start the practical use in traffic lights, large-sized full-color displays for outdoors, various car lamps, and backlights of liquid crystal displays in the cellular phones, which has heretofore been impossible in brightness or efficiency.

It is thought that this high-efficiency high-brightness LED is also applied as a promising small-sized light emitting source of the illumination apparatus requiring a condensing property. The LED is originally superior to the other light emitting sources in life, durability, lighting-on speed, and simplicity of a lighting-on/driving circuit. Above all, the blue color is added, three primary colors are obtained as spontaneous-light emitting sources, and an application range of a full-color image display apparatus has therefore been enlarged. Typical examples of the illumination apparatus whose condensing property is demanded include a projector display apparatus (image projection apparatus) in which a display image is formed and projected from image data. The image projection apparatus has heretofore separated desired primary colors from a white-based light emitting source by color filters, and has subjected the image data corresponding to each color to spatial light modulation. When the light obtained by the spatial light modulation is spatially or temporally synthesized, color image display is possible. When the white-based light emitting source is used, only the desired color is separated and used. Therefore, the colors other than the separated color are uselessly discarded by the filter in many cases. In this respect, since the LED emits the light of the desired color itself, a necessary quantity of light can be emitted when necessary. As compared with the conventional white-based light emitting source, the light is not wasted, and the light of the light emitting source can be used with good efficiency.

This superior application condition of the LED has been noticed. For example, Jpn. Pat. Appln. KOKAI Publication No. 11-32278, U.S. Pat. No. 6,227,669B1, U.S. Pat. No. 6,318,863, and the like disclose an example in which the LED is applied to the illumination apparatus for the image projection apparatus. The technique disclosed in these publications comprises: disposing a plurality of LEDs to secure a quantity of light; condensing some of fluxes from the individual light emitting sources by optical elements such as the optical lens; and controlling the fluxes so that a light modulation element to be irradiated is well defined at an allowed incidence angle. For the light modulation elements such as a liquid crystal device broadly used in general, since the allowed incidence angle is small, it is supposedly ideal to form the flux having higher parallelism and to irradiate the elements. This is a very important point in enhancing light use efficiency in the light modulation element.

BRIEF SUMMARY OF THE INVENTION

According to a first aspect of the present invention, there is provided an illumination apparatus which directs light from a light source to an illuminated area, comprising:

a plurality of light emitters as the light source;

a lighting unit configured to cause the light emitters to emit light so that the intensities of light emitted by them can be adjusted;

an optical system configured to, of light emitted by the emitters, direct light passed through its light concentration area to the illuminated area;

a light control member configured to perform at least one of changing the path of light from the emitters to be directed to the illuminated area and moving of the light emitters;

a movement unit configured to allow the light control member to operate; and a light selector control unit configured to control at least one of the movement unit and the lighting unit so as to select light to be directed to the illuminated area from light of the emitters, wherein the light selector control unit controls the lighting unit to cause an emitter to emit light when it is positioned in the vicinity of the light concentration area by the operation of the light control member.

According to a second aspect of the present invention, there is provided a projector display apparatus comprising:

an illumination apparatus which directs light from a light source to an illuminated area including:

a plurality of light emitters as the light source;

a lighting unit configured to cause the light emitters to emit light so that the intensities of light emitted by them can be adjusted;

an optical system configured to, of light emitted by the emitters, direct light passed through its light concentration area to the illuminated area;

a light control member configured to perform at least one of changing the path of light from the emitters to be directed to the illuminated area and moving of the light emitters;

a movement unit configured to allow the light control member to operate; and a light selector control unit configured to control at least one of the movement unit and the lighting unit so as to select light to be directed to the illuminated area from light of the emitters, wherein the light selector control unit controls the lighting unit to cause an emitter to emit light when it is positioned in the vicinity of the light concentration area by the operation of the light control member;

a light modulation device placed in the illuminated area configured to light-modulate light from the illumination apparatus according to image data;

a projection unit configured to project light modulated by the light modulation device; and a light modulation device control unit configured to switch the light modulated states of the light modulation device, wherein the light selector control unit of the illumination apparatus selects an emitter to emit light in synchronism with the switching of the light modulated states of the light modulation device.

According to a third aspect of the present invention, there is provided an illumination apparatus which directs light from a light source to an illuminated area, comprising:

a plurality of light emitters as the light source;

lighting means for causing the light emitters to emit light so that the intensities of light emitted by them can be adjusted;

optical means for, of light emitted by the emitters, directing light passed through its light concentration area to the illuminated area;

a light control member for performing at least one of changing the path of light from the emitters to be directed to the illuminated area and moving of the light emitters;

movement means for allowing the light control member to operate; and light selector control means for controlling at least one of the movement means and the lighting means so as to select light to be directed to the illuminated area from light of the emitters, wherein the light selector control means controls the lighting means to cause an emitter to emit light when it is positioned in the vicinity of the light concentration area by the operation of the light control member.

According to a fourth aspect of the present invention, there is provided a projector display apparatus comprising:

an illumination apparatus which directs light from a light source to an illuminated area including:

a plurality of light emitters as the light source;

lighting means for causing the light emitters to emit light so that the intensities of light emitted by them can be adjusted;

optical means for, of light emitted by the emitters, directing light passed through its light concentration area to the illuminated area;

a light control member for performing at least one of changing the path of light from the emitters to be directed to the illuminated area and moving of the light emitters;

movement means for allowing the light control member to operate; and light selector control means for controlling at least one of the movement means and the lighting means so as to select light to be directed to the illuminated area from light of the emitters, wherein the light selector control means controls the lighting means to cause an emitter to emit light when it is positioned in the vicinity of the light concentration area by the operation of the light control member;

a light modulation device placed in the illuminated area for lightmodulating light from the illumination apparatus according to image data;

projection means for projecting light modulated by the light modulation device; and light modulation device control means for switching the light modulated states of the light modulation device, wherein the light selector control means of the illumination apparatus selects an emitter to emit light in synchronism with the switching of the light modulated states of the light modulation device.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a schematic illustration of an illumination apparatus according to a first embodiment of the present invention;

FIG. 2 shows the configuration of the light emission unit of FIG. 1;

FIG. 3 is a graph of emitted light intensity versus applied current for an LED chip;

FIG. 4 shows the times at which seven LED chips in FIG. 2 are turned on to emit light;

FIG. 5 shows a modification of the light emission unit in the first embodiment;

FIG. 6A is a rear view of a light emission unit according to a further modification of the light emission unit in the first embodiment;

FIG. 6B is a sectional view taken along line b–b' in FIG. 6A;

FIGS. 12A through 12E show positional relationships of an LED chip with respect to the light concentration area;

FIG. 13 shows the relationship between the operation distance and the timing of light emission and intensities of light emitted by the LED chips when the light emission unit is moved by a stepping motor in the configuration of FIG. 10;

FIG. 25 is a schematic illustration of a projector display apparatus according to a third embodiment of the present invention;

FIG. 26A is a front view of the light emission unit in the projector display apparatus of the third embodiment;

FIG. 26B is a plan view of the light emission unit in FIG. 26A;

DETAILED DESCRIPTION OF THE INVENTION

Figure 7:
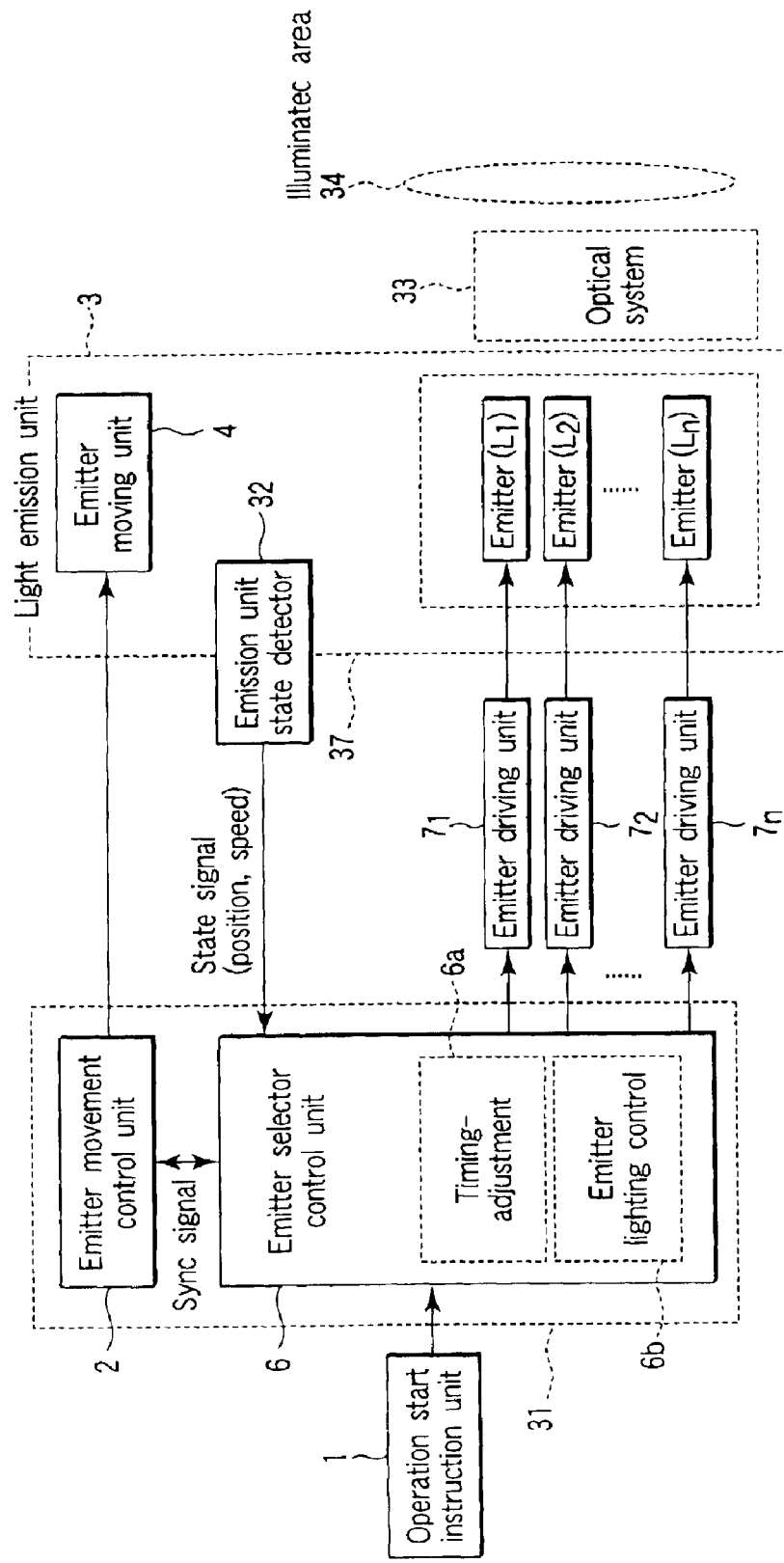
FIG. 7 is a schematic illustration of an illumination apparatus according to a second embodiment of the present invention.

The preferred embodiments of the present invention will be described hereinafter with reference to the accompanying drawings.

[First Embodiment]

First, the basic illumination principle of an illumination apparatus according to a first embodiment will be described with reference to FIGS. 1 through 6B.

Here, a description is given of the illumination principle with reference to FIGS. 1 and 2. The "Illumination principle" means to illuminate brightly an illuminated area by emitter driving units 71–7n (collectively referred to as emitter driving units 7) as lighting units, optical lenses 17 and 18 as an optical system, an emitter moving unit 4 as a movement unit, an emitter movement control unit 2 and an emitter selector control unit 6 which act as a light selector control unit. The emitter driving units 7 have a function for adjusting the intensities of light emitted by emitters, for example, high-brightness light emitting diodes (hereinafter referred to as LED chips).

The optical lenses 17 and 18 cause light emitted from an emitter to converge onto the illuminated area. The emitter moving unit 4 allows a support member 11 as a light control member to operate and is comprised of, for example, a voice coil motor 12. The emitter movement control unit 2 provides a controlled variable to the emitter moving unit 4, by which an LED chip is allowed to move to the emission reference position aligned with the center of the light concentration area of the optical lenses. The emitter selector control unit 6 provides a control variable to each of the emitter driving units 7 when a corresponding one of the LED chips is placed in the reference position, so that it is supplied with a single large pulse of current to emit light.

FIG. 1 shows, in block diagram form, the illumination apparatus according to the first embodiment to describe the illumination principle. An operation start instruction unit 1 outputs a signal to the illumination apparatus to start the illumination operation. The operation start instruction is output in response to an operation of a trigger switch (not shown) by a user to start illumination. Alternatively, the outputting of the operation start instruction may be interlocked with another functional block that requires activation of an illumination operation. The signal output from the operation start instruction unit 1 is applied to the emitter movement control unit 2.

Meanwhile, a light emission unit 3 is equipped with a plurality of emitters, for example, LED chips L1 to Ln, which are adapted to move mechanically. The emitter moving unit 4 moves the LED chips. The emitter movement control unit 2 provides a control variable to the emitter moving unit 4 to drive the LED chips to move. The LED chips are moved by the emitter moving unit 4 at a high speed according to the control variable. The emitter moving unit 4 may be electrically driven and controlled, such as an electromagnetic motor, an electrostatic motor, or the like. A suitable means is chosen according to requirements.

In the vicinity of the LED chips is provided an emitter position detector 5 including an emitter position sensor which detects the distance moved by or the timing of moving of the LED chips. The emitter position detector 5 determines an LED chip to be driven to emit light and outputs the detected signal through LED chip position detection.

The signal output from the emitter position detector 5 is input to the emitter selector control unit 6. Based on that signal, the control unit 6 selects an LED chip to emit light and outputs a control variable for on-off of emission or intensity of light to the selected LED chip. The output control variable is applied to the selected one of the emitter driving units 71 to 7n respectively corresponding to the LED chips L1 to Ln. This example indicates that the LED chips are n in number.

The LED chips L1 to Ln may be configured to emit different colors of light. In this case, moving the LED chips at a high speed of, say, less than 1/60 sec will allow a mixed colors to be produced through the visual afterglow phenomenon. The perceptible mixed color can be set flexibly according to a combination of colors of light emitted by the LED chips or their intensities. Therefore, setting a desired mixed color of illumination light in an illumination color setting unit 8 allows the emitter selection control unit 6 to output corresponding control variables to the emitter driving units 7. The setting of illumination color in the illumination color setting unit 8 may be made mechanically, electrically, or by software. In addition, an illumination color may be set either directly or indirectly; in the direct setting, a desired color is set in the color setting unit and, in the indirect setting, the intensity of emitted light of each LED adapted to emit a different color of light is set individually. Moreover, to set a mixed color, the light emission time of each individual LED chip may be varied.

That is, the present embodiment is configured such that a plurality of LED chips are moved at high speed, an LED chip placed in a specific position is caused to emit light in the form of a single pulse, and each of the LED chips is caused to emit light in rapid succession in that specific position. Thereby, apparent continuous emission equivalent to emission by one LED chip can be provided.

FIG. 2 shows the configuration of the illumination apparatus when it is configured most simply according to the illumination principle using the emission unit 3 described in connection with FIG. 1. In this example, seven LED chips are used as the emitters. That is, the LED chips L1 to L7 are mounted at regularly spaced intervals on the support member 11 as shown. Each of the LED chips has a bullet-like cap lens. The support member 11 is allowed to slide at a high speed in the directions Al indicated by arrows by means of the voice coil motor 12 corresponding to the emitter moving unit 4.

On the rear side of the support member 11 seven reflectors 13 are formed at a distance apart from one another so that each of them is paired with a corresponding respective one of the LED chips L1 to L7. These reflectors 13 form the emitter position detector 5 together with a light emitting element 14 and a light receiving element 15. That is, when moved to the receiving reference position 16, each of the reflectors 13 reflects light emitted from the light emitting element 14 onto the light receiving element 15 as shown. Thus, counting the number of reflections starting with reflection from the first reflector allows the detection of which of the LED chips is being placed in the emission reference position 16. In the example of FIG. 2, the LED chip L1 is placed in the emission reference position 16.

The optical lenses 17 and 18 are placed in front of the LED chip placed in the emission reference position 16. Here, the lens 17 is a condenser lens which concentrates emitted light. The lens 18 is a condenser lens which controls the path of light so that light concentrated by the lens 17 can be directed to a desired area to be illuminated. At the time when an LED chip passes through the emission reference position 16 as the result of movement of the support member 11, it emits light and the resultant light is directed to the illuminated area. By repeating this operation for each of the LED chips L1 to L7, apparently continuous illumination light can be obtained during a certain period of time even if the chips are driven to emit light on a time division basis.

FIG. 3 is a graph of intensity of emitted light versus applied current for an LED chip. That is, with the LED chips, the intensity of emitted light increases with increasing applied current though tolerance limits exist. The tolerance limits depend naturally on the characteristics of materials used, the composition defects, the radiation performance, the conductivity characteristics of peripheral electrodes, etc. Even with the same chip, by enhancing the radiation performance in particular, it becomes possible to apply a current in excess of the rated applied current for continuous emission and thereby obtain emitted light of a large intensity.

To enhance the radiation performance, the thermal conductivity of the periphery of the chip is simply increased to radiate heat in a shorter time. It is also possible to suppress the generation of heat through pulsed emission of a very short duration as opposed to continuous emission. That is, the intensity of emitted light can be greatly increased as compared with continuous emission by applying more current within a very short time. The employment of this property and the illumination principle of the present embodiment allows the production of intense light which is impossible with continuous emission.

Although in the above description the LED chips L1 to L7 are adapted to move relative to the optical lenses 17 and 18, the optical lenses may be moved relative to the LED chips, which, of course, will result in the same effects.

FIG. 4 is a timing diagram illustrating the times of emission by the LED chips L1 to L7 described with reference to FIG. 2. The time is shown on the horizontal axis and the intensity of emitted light is shown on the vertical axis. As can be seen from FIG. 4, the LED chips L1 to L7 are driven on a time division basis to provide light emission in a continuous form.

FIG. 5 shows a configuration in which the optical lenses 17 and 18 in FIG. 2 are replaced by a single rod lens 19. The use of such a rod lens also allows illumination light to be produced as with the optical system of FIG. 2.

FIGS. 6A and 6B show a further modification of the emission unit 3 of the present embodiment. FIG. 6A is a rear view of the emission unit 3 and FIG. 6B is a sectional view taken along line b–b' in FIG. 6A. In this modification, a plane reflecting mirror 21 as a light control member is integrally coupled with a rotation axis 20. The rotation axis 20 is supported by a rotation axis bearing 22 and coupled with a drive motor 23. This motor allows the plane reflecting mirror 21 to rotate at high speed in the direction A2.

A drum-shaped support member 24 is provided in a fixed position with the rotation axis 20 as its central axis. LED chips 25 are arranged closely in two rows on the inner surface of the drum-shaped support member 24. In FIG. 6A, instead of drawing each of the LED chips individually, LED chip arrays 26R, 26G and 26B are drawn with different hatching for the purpose of simplifying the illustration. In each of these arrays, LED chips which emit light of the same color are arranged. The LED chip arrays 26R, 26G and 26B are switched in sequence so that red (R), green (G) and blue (B) are produced in this order.

Two sets of condenser lenses 27 are supported by a rotating support member 28 integrally coupled with the rotation axis 20 so that they can rotate conjointly with the plane reflecting mirror 21. Although it is essential that the number of the rows of LED chips and the number of the sets of condenser lenses be equal to each other, the number itself may be set as needed.

Such a configuration is adapted to produce illumination light which allows field pictures of three primary colors required for one frame of color picture to be produced during one rotation of the plane reflecting mirror 21. That is, each of the LED chips 25 arranged on the inner surface of the drum-shaped support member 24 emits light in sequence so that points 29 of emission move along the inner surface of the drum. In this case, when the plane reflecting mirror 21 rotates, emission control is performed so that the LED chips opposed to the mirror emit light. That is, light emitted from the LED chips 25 is reflected by the plane reflecting mirror 21, then gathered and directed to the illuminated area through an optical lens 30.

That is, when the plane reflecting mirror 21 rotates, emission control is performed so that the LED chips opposed to the mirror emit light. The condenser lenses 27 are placed in such a positional relation with respect to the LEDs that allows for best light condensing. That is, the light emitted from the LED chips 25 is first condensed by the condenser lenses 27, then reflected by the plane reflecting mirror 21 and directed to the illuminated area through the optical lens 30.

The first embodiment of the present invention has been described in terms of the basic principle that continuous emission equivalent to emission by a single LED chip can be obtained apparently by moving a plurality of LED chips L1 to Ln at high speed or rotating the plane reflecting mirror 21 and the condenser lenses 27 at high speed, causing an LED chip placed in the particular position (the emission reference position 16 or the emission point 29) to produce a single pulse of light, and causing each of the LED chips to emit light in rapid succession.

In particular, an illumination apparatus which brightly illuminates an illuminated area with concentrated light or collimated light has been described. Such an illumination apparatus can also be adapted for flash illumination for image pickup devices. Although the present embodiment has been described in terms of short-time illumination for the purpose of simplifying the description, this is not restrictive. The present embodiment is applicable to illumination apparatus adapted for continuous illumination, such as a torch light.

[Second Embodiment]

Next, a second embodiment of the present invention will be described. The second embodiment is directed to an illumination apparatus required to illuminate brightly and uniformly an illuminated area so that there is a large difference in brightness between the illuminated area and a non-illuminated area like a spotlight or the illumination system of a projector display apparatus utilizing the aforementioned basic principle. To simplify the description, like the first embodiment, the second embodiment will also be described in terms of an illumination apparatus adapted for short-time illumination.

First, an illumination apparatus which brightly illuminates an illuminated area with concentrated light or collimated light like a spotlight and does not illuminate areas other than the illuminated area will be described with reference to FIGS. 7 through 21.

Here, the spotlight requires an optical system that illuminates brightly and uniformly a restricted illuminated area and not the periphery of the illuminated area. To this end, taking an emission area where light is concentrated on an illuminated area as a light concentration area, a detailed description is given of the relationship among: lighting control in the light selection control unit to solve a problem of how to cause an LED placed in the light concentration area to emit light; movement control in the light selection control unit to solve a problem of how to move the LED chip to the light concentration area and stop it; and the optical system to solve the problem of how to direct light emitted from the LED chip in the light concentration area to the illuminated area.

FIG. 7 shows, in block diagram form, the illumination apparatus according to the second embodiment. In this figure, corresponding components to those in FIG. 1 are denoted by like reference numerals and descriptions thereof are omitted. Here, only the different portions will be described.

A light selector control unit 31 comprises the emitter movement control unit 2 and the emitter selector control unit 6. In the present embodiment, as shown in FIG. 7, the emitter selector control unit 6 is comprised of a timing-adjustment unit 6a and an emitter lighting control unit 6b. The emission unit 3 includes an emission unit state detector 32 which detects the position and the speed of an LED chip. The detection signals are input to the timing-adjustment unit 6a to establish synchronization between the emitter movement control unit 2 and the emitter selector control unit 6.

That is, in the configuration of FIG. 1, the emitter movement control unit 2 moves the emission unit 3, the emitter position detector 5 detects the position of an LED chip, and the emitter selector control unit 6 selectively lights the LED chip. The configuration of FIG. 7 according to the second embodiment includes not only the control of the first embodiment but also timing control for the travel speed or rotational phase of the emitter movement control unit 2 according to signals produced by the timing-adjustment unit 6a.

Through the use of a microencoder, the emission unit state detector 32 allows even finer timing control and LED chip movement control than described in connection with FIGS. 2 through 5. Of course, instead of using the microencoder, a pulse motor may be used which allows movement control in fine angular steps. In the case of this pulse motor, the emission unit state detector 32 may be omitted or disabled from operating. Even in such an event, synchronization could be established between the emitter movement control unit 2 and the emitter selector control unit 6.

The lighting control of an LED chip turns it on and off. The LED chip is can be supplied with a current which is seven times as large as the rated current when it is lit all the time with short-time lighting in view. In this case, the resultant intensity of emitted light is five times larger than the value at the rated current. This depends on the relationship between the applied current and the intensity of emitted light which has been described in connection with FIG. 3. However, in practice, the applied current and the intensity of emitted light vary according to the performance of each LED chip and the on and off timing. For example, five times as large as the rated current may result in a sevenfold increase in intensity of emitted light.

Figure 8:
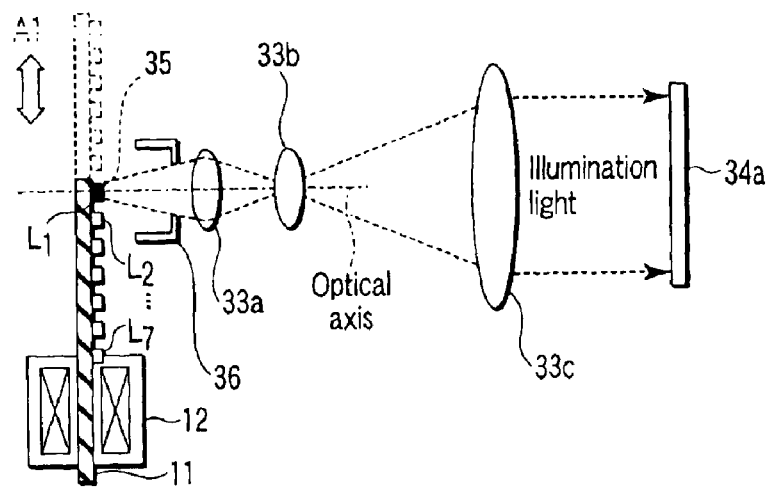
FIG. 8 shows the configuration of the light emission unit in the second embodiment.

FIG. 8 shows the configuration of the emission unit 3 of the present embodiment. In this figure, parts that have the same functions as those in FIG. 2 are denoted by like reference numerals and descriptions thereof are omitted. Only the different portions will be described. In the present embodiment, the emission unit state detector 32 has a microencoder, not shown. Each of the LED chips L1 to L7 has no bullet-like cap lens. That is, the LED chip itself has no optical means such as a lens. Light is concentrated on an illuminated area 34 by means of an optical system 33.

The optical system 33 is one which allows rays of light passed through any portion of a light concentration area 35 of a given size positioned in the vicinity of the emitting surface of the LED chip to be directed uniformly and efficiently to the entire surface of the illuminated area 34. In the present embodiment, the optical system is comprised of a condenser microlens 33a, a deflecting microlens 33b, and a superimposition lens 33c.

That is, means for concentrating light emitted from the LED chip is a two-stage configuration consisting of the condenser microlens 33a and the deflecting microlens 33b. In this case, a conjugate positional relationship is established between the condenser microlens 33a and a to-be-illuminated liquid crystal display (LCD) placed in the illuminated area 34 as opposed to the LED chip and the illuminated area. The condenser microlens 33a is positioned in the vicinity of the first focal point on the chip side of the deflecting microlens 33b so that the image of the LED chip formed by the condenser microlens 33a is positioned in the vicinity of the deflecting microlens. Thereby, an entrance pupil formed on the condenser microlens 33a can be relayed by means of the deflecting microlens 33b and the succeeding superimposition lens 33c. Onto the illuminated area 34.

In the present embodiment, there is further provided a light-tight member 36 which blocks rays of light which cannot be effectively directed to the illuminated area 34 by the optical system 33.

Figure 9:
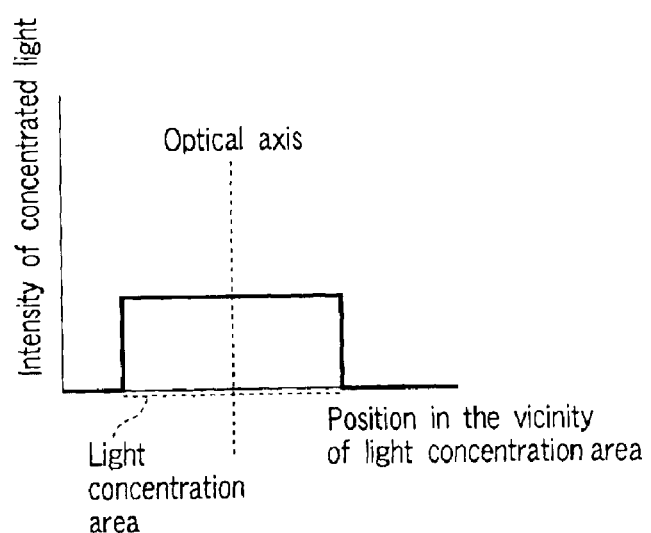
FIG. 9 shows the light gathering property of the light concentration area of the optical system.

FIG. 9 shows the light-concentration property of the light concentration area 33 of the optical system 33. As can be seen, the light-concentrating ability of the optical system is constant over the light concentration area 35.

Next, a detailed description is given of the lighting control of the LED chips in view of the LED chip size, the size of the light concentration area 35, and the operation of the movement unit 37 when the optical system 33 that exhibits the property shown in FIG. 9 is used. Although various methods of lighting control can be considered, some of them will be described below with reference to FIGS. 10 through 21 which illustrate positional relationships between the light concentration area and the light control member and the timing of the lighting control. FIGS. 18 through 21 are diagrams for use in explanation of lighting control which allows the intensity of light in the illuminated area to be constant over a predetermined period of time when a plurality of LED chips is selected.

First, symbols used in these figures are explained. Ds denotes the LED chip size, Dp denotes the pitch of the LED chips, and Do denotes the size of the light concentration area 35. Dm denotes the distance between the reference position corresponding to the center of the light concentration area 35 aligned with the optical axis of the optical system 33 and the end of the support member 11 of the emission unit 3, which varies as the emission unit is operated. Lb denotes the intensity of light incident on the entire surface of the illuminated area 34 when one LED chip fixed in the light concentration area 35 without being moved is continuously lit with the rated current. Lr denotes the average intensity of light incident on the illuminated area 34 over a period of time from initiation to termination of illumination when a plurality of LED chips are lit by the light selector control unit 31.

Figure 10:
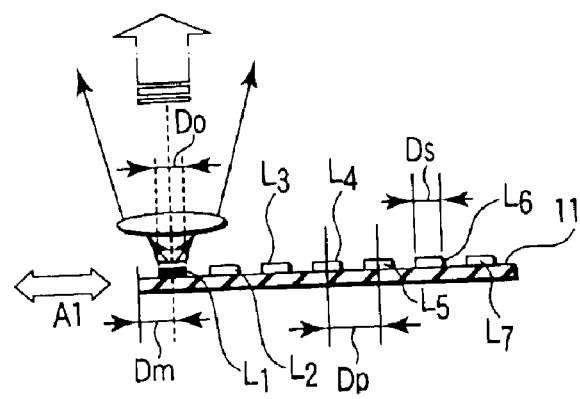
FIG. 10 shows the positional relationship between the light concentration area and the light control member when the pitch of the LED chips is larger than the LED chip size.
Figure 11:
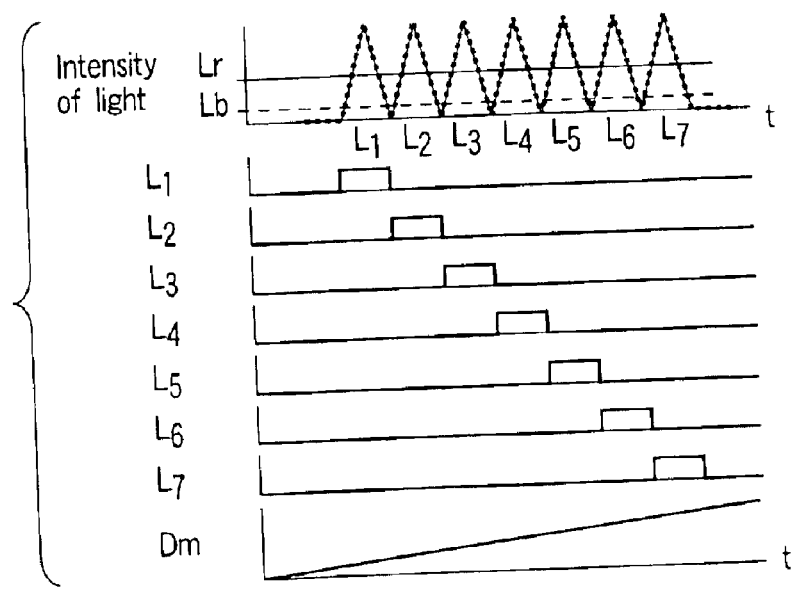
FIG. 11 shows the relationship between the operation distance and the timing of light emission and intensities of light emitted by the LED chips in the configuration of FIG. 10.

FIG. 10 is a diagram for use in explanation of lighting control by the light selector control unit 31 when Dp, Ds and Do are set such that Dp/2=Ds=Do. In this configuration, the LED chips are arranged so that two or more LED chips cannot emit light in the light concentration area 35. In this case, the emission unit 3 is operated by the emitter movement control unit 2 so that Dm increases linearly with time. FIG. 11 is a timing diagram illustrating the LED chip lighting control by the emitter selector control unit 6. In FIG.

11, the times at which the LED chips L1 to L7 emit light in sequence as Dm increases are illustrated. In addition, the intensity of light concentrated onto the illuminated area 34 is indicated by a dotted line and the intensity of light for each LED chip is indicated by a solid line. The same applies to the subsequent timing diagrams through FIG. 24.

Each of the LED chips is subjected to lighting control under the above conditions so that it is lit during all the time when its any portion faces the light concentration area 35 as the result of the operation by movement control. Bright illumination can therefore be provided.

FIGS. 12A through 12E illustrate the positional relationship between the LED chip and the light concentration area 35. The relationship between the lighting timing and the position of the LED chip relative to the light concentration area will be described in detail with reference to these figures. All the time when any portion of the LED chip faces the light concentration area 35 means when the chip is positioned with respect to the light concentration area as shown in FIGS. 12B, 12C and 12D. At this point, the LED chip is lit. In contrast, when the chip is positioned with respect to the light concentration area as shown in FIGS. 12A and 12E, it is turned off.

To light the LED chip during that time, it is supplied with a current which is seven times the rated current at the time of normal lighting, to obtain the light intensity Lb. This allows the average intensity Lr to be increased above the intensity Lb at the time of normal lighting, providing bright illumination. Since the LED chip is turned off during other periods than the lighting period, its radiation performance is enhanced. Control is therefore performed so as to avoid excess power consumption.

FIG. 13 is a timing diagram under conditions that Dp/2=Ds=Do, as in the case of FIG. 10. In this example, the emitter movement control unit 2 uses a stepping motor as opposed to a DC motor. Therefore, Dm is indicated to increase in discrete steps.

The lighting control of the LED chip is performed in such a way that it is lit immediately after the termination of a stepping operation of the stepping motor and turned off after the elapse of a predetermined period of time. That is, an LED chip is lit when the stepping motor is placed in the stopped state. For example, lighting control can be performed on the basis of the result of detection of the stopped state of the stepping motor. Alternatively, lighting control may be performed in such a way as to measure beforehand the time interval from when the stepping motor is instructed to stop until it comes to a stop and turn on an LED chip after a wait of that time interval.

Thus, the illuminated area can be illuminated with a constant intensity of light during the lighting period, and moreover, brightly. Furthermore, the absence of emission in other areas than the light concentration area 35 allows power consumption to be reduced. That is, the average light intensity Lr is increased above the intensity Lb at the time of normal lighting, providing bright illumination. The radiation performance of the LED is enhanced by turning it on only during the lighting period. Control is therefore performed so as to avoid excess power consumption.

The above control scheme is not restrictive. The control is merely performed as indicated in the timing diagram of FIG. 13. For example, although, in the above control, lighting control is performed by detecting the stopped state of the stepping motor, lighting control may be performed in such a way as to detect the position of an LED chip and turn it on when it is positioned just under the light concentration area 35. That is, the LED chip is allowed to emit light when its emitting surface is covered in its entirety with the light concentration area 35 where rays of light are concentrated by the condenser microlens 33a. This control provides efficient concentration of light.

In this case, Ds=Do. Since the LED chip size at the surface of emission is equal to the size of the light concentration area, exact motor control is required in order to exactly stop the LED chip in that position. In view of the accuracy of motor control, the position of the LED chip may be detected in terms of the rate at which the chip is covered with the light concentration area 35. For example, when the rate is not less than 80%, the LED chip may be turned on.

As described above, lighting control can be performed in accordance with various types of detection information, such as the stopped state of the stepping motor, the relative position of the LED chip and the light concentration area 35, the time from when an stepping operation is initiated, etc.

Figure 14:
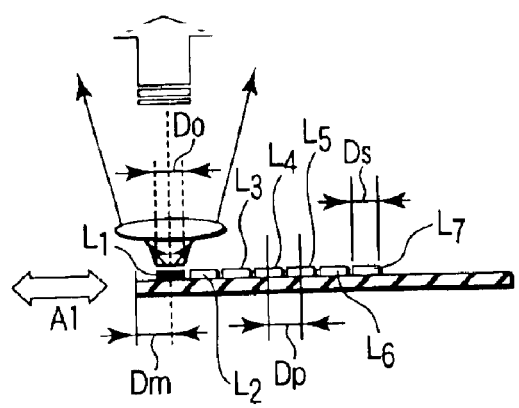
FIG. 14 shows the positional relationship between the light concentration area and the light control member when the LED chip size is made smaller than twice the pitch of the LED chips.

FIG. 14 shows a case where the LED chips are arranged so that two or more chips face the light concentration area 35 at the same time. In this case, all of these chips are turned on at the same time. Thereby, illumination can be made much brighter.

Figure 15:
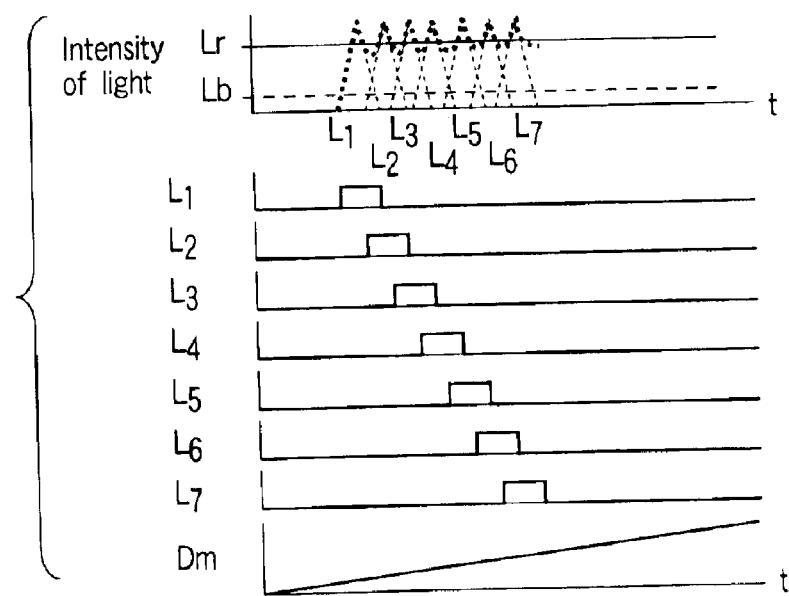
FIG. 15 shows the relationship between the operation distance and the timing of light emission and intensities of light emitted by the LED chips in the configuration of FIG. 14.

In FIG. 14, Dp, Ds and Do are set such that Dp/2<Ds=Do. The emitter movement control unit 2 and a DC motor are used as in the case of FIG. 10. The lighting control in this case is performed in such a way that each of the LED chips is lit as long as its any portion faces the light concentration area 35 as the result of the operation by movement control as shown in FIG. 15. The control of FIG. 15 differs from the control of FIG. 13 in that there are periods in which two LED chips are lit at the same time. Of course, the average light intensity Lr is increased above the intensity Lb at the time of normal lighting, providing bright illumination. The radiation performance of the LED is enhanced by turning it on only during the lighting period. Control is therefore performed so as to avoid excess power consumption.

Figure 16:
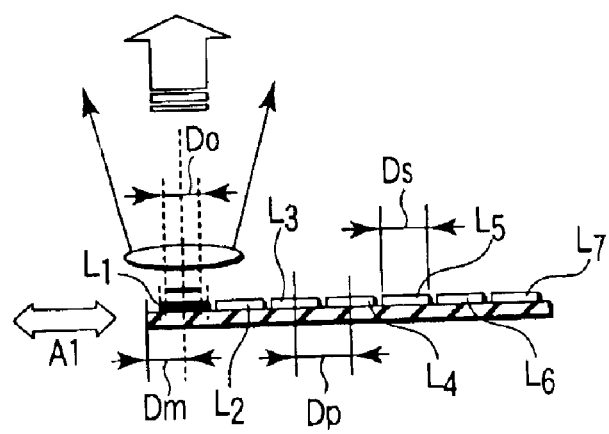
FIG. 16 shows the positional relationship between the light concentration area and the light control member when the LED chip size is set smaller than twice the pitch of the LED chips and larger than the size of the light concentration area.
Figure 17:
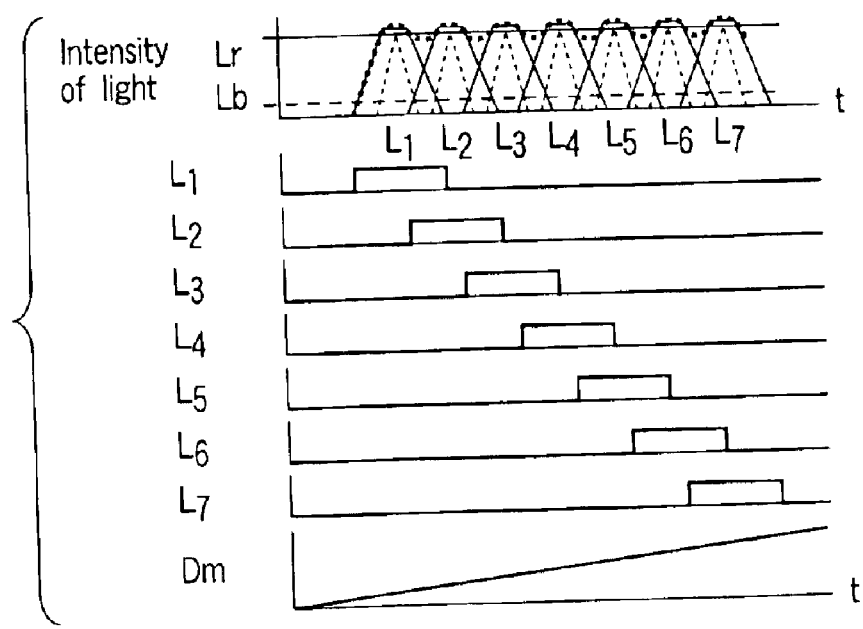
FIG. 17 shows the relationship between the operation distance and the timing of light emission and intensities of light emitted by the LED chips in the configuration of FIG. 16.

In FIG. 16, the LED chips are arranged under conditions that Dp/2<Ds>Do. In this case, lighting control is performed in such a way that an LED chip is lit when at least a part of its emitting surface faces the light concentration area 35 and rays of light emitted by it can be concentrated by the condenser microlens 33a. That is, the LED chips are turned on at the times indicated in FIG. 17. In this case, the emitter movement control unit 2 and a DC motor are used as in the case of FIG. 10.

The lighting control of LED chips arranged under the conditions as shown in FIG. 16 is performed in such a way that each of the LED chips is lit as long as its any portion faces the light concentration area 35 as the result of the operation by movement control as in the case of FIG. 15. In addition, the control is performed so that there are periods when two LED chips are lit at the same time. Of course, the average light intensity Lr is increased above the intensity Lb at the time of normal lighting, providing bright illumination. The radiation performance of the LED is enhanced by turning it on only during the lighting period. The control is therefore performed so as to avoid excess power consumption.

Figure 18:
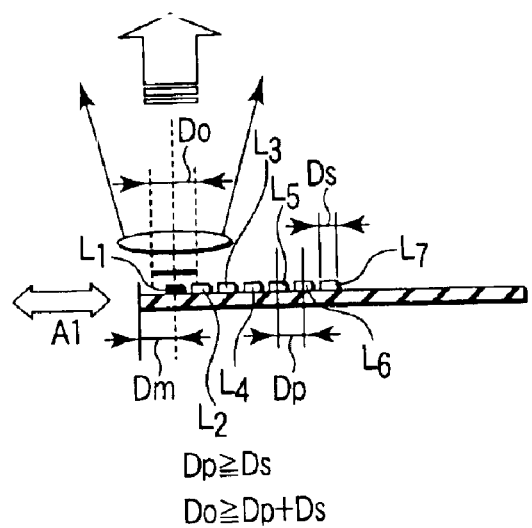
FIG. 18 shows the positional relationship between the light concentration area and the light control member when the pitch of the LED chips is set equal to or larger than the LED chip size and the light concentration area size is set equal to or larger than the pitch of the LED chips.

In FIG. 18, the LED chips are arranged under conditions that Do≧Dp+Ds. In other words, the arrangement is such that two LED chips are allowed to face the light concentration area 35 at the same time.

That is, Dp, Ds and Do are set such that Dp≧Ds and Do≧Dp+Ds. The emitter movement control unit 2 and a DC motor are used as in the case of FIG. 10.

Figure 19:
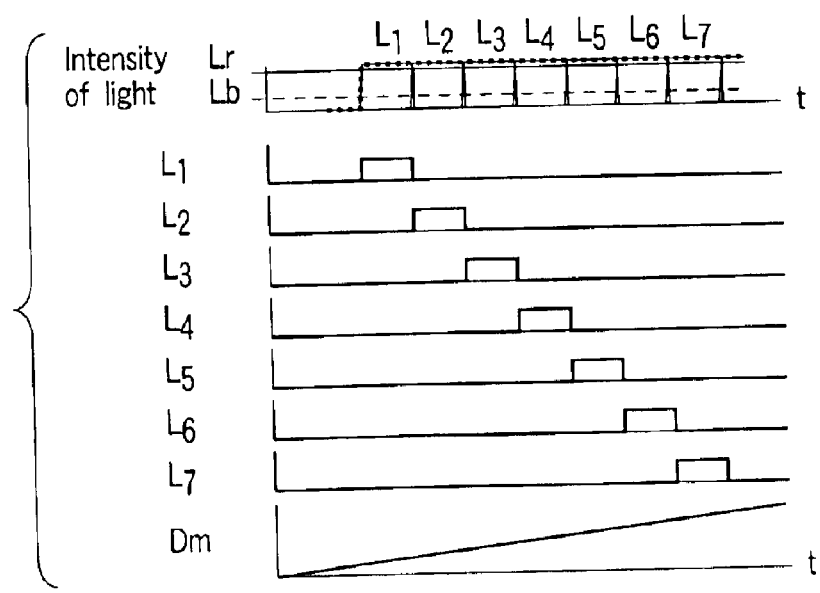
FIG. 19 shows the relationship between the operation distance and the timing of light emission and intensities of light emitted by the LED chips in the configuration of FIG. 18.

The LED lighting control as shown in the timing diagram of FIG. 19 differs from the control in which each of the LED chips is lit as long as its any portion faces the light concentration area 35 as the result of movement. That is, the control is performed in such a way that, after one LED chip has been turned on, it is turned off at the time when the next LED chip is covered in its entirety with the light concentration area 35 and the next LED chip is turned on when the preceding LED chip is turned off. Namely, two LED chips are never turned on at the same time and each LED chip is lit when it is covered in its entirety with the light concentration area. Of course, the average light intensity Lr is increased above the intensity Lb at the time of normal lighting, providing bright illumination. Irrespective of LED switching, a constant intensity of light can be obtained at the illuminated area 34. The radiation performance of the LED is enhanced by turning it on only during the lighting period. The control is therefore performed so as to avoid excess power consumption.

Figure 20:
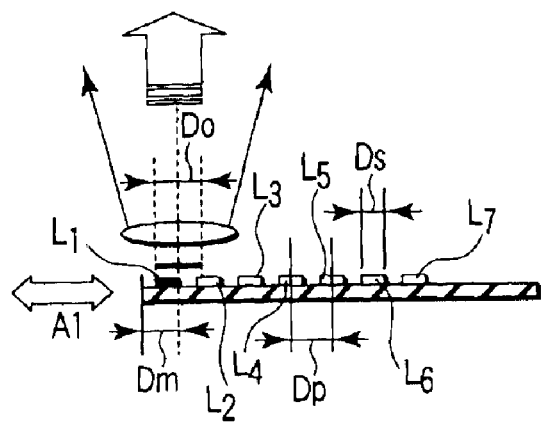
FIG. 20 shows the positional relationship between the light concentration area and the light control member when the pitch of the LED chips is set larger than the LED chip size and the light concentration area size is set equal to the pitch of the LED chips.

In FIG. 20, the LED chips are arranged such that Do=Dp and each of the LED chips is lit as long as its any portion faces the light concentration area 35. Thereby, the intensity of light at the illuminated area 34 can be kept constant.

The arrangement of FIG. 20 makes it a condition that the emitting surface of one or two LED chips are always covered with the light concentration area 35 by the amount corresponding to the chip size Ds. That is, the condition is set such that Dp≧Ds and Do=Dp. In this case, the emitter movement control unit 2 and a DC motor are used as in the case of FIG. 10.

Figure 21:
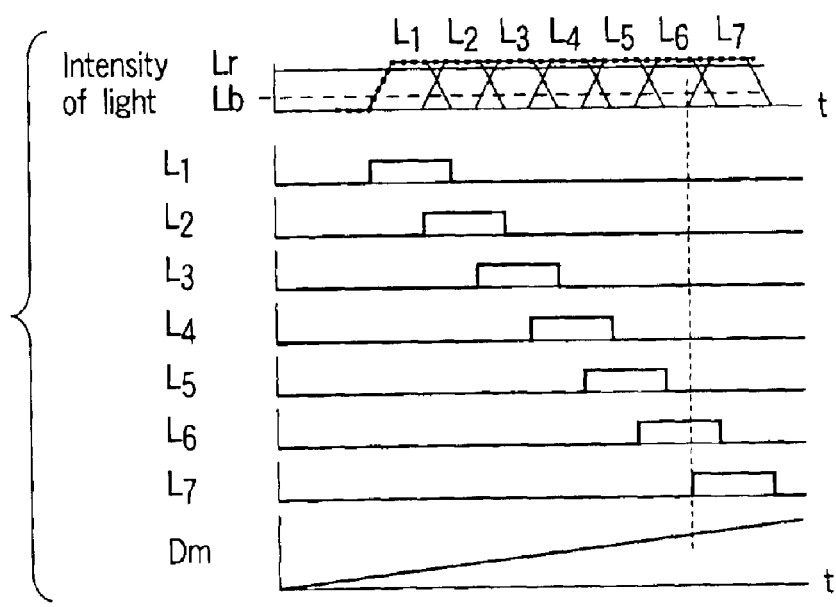
FIG. 21 shows the relationship between the operation distance and the timing of light emission and intensities of light emitted by the LED chips in the configuration of FIG. 20.

The lighting control of LED chips as shown in the timing diagram of FIG. 21 is performed in such a way that each of the LED chips is lit as long as its any portion faces the light concentration area 35 as the result of the operation by movement control. That is, the lighting of each LED chip is commenced at the time when its leading end enters into the light concentration area 35 and ended at the time when its trailing end exits the light concentration area. In addition, the control is performed so that there are periods when two LED chips are lit at the same time.

Of course, the average light intensity Lr is increased above the intensity Lb at the time of normal lighting, providing bright illumination. Irrespective of LED switching, a constant intensity of light can be obtained at the illuminated area 34. The radiation performance of the LED is enhanced by turning it on only during the lighting period. The control is therefore performed so as to avoid excess power consumption.

Figure 22:
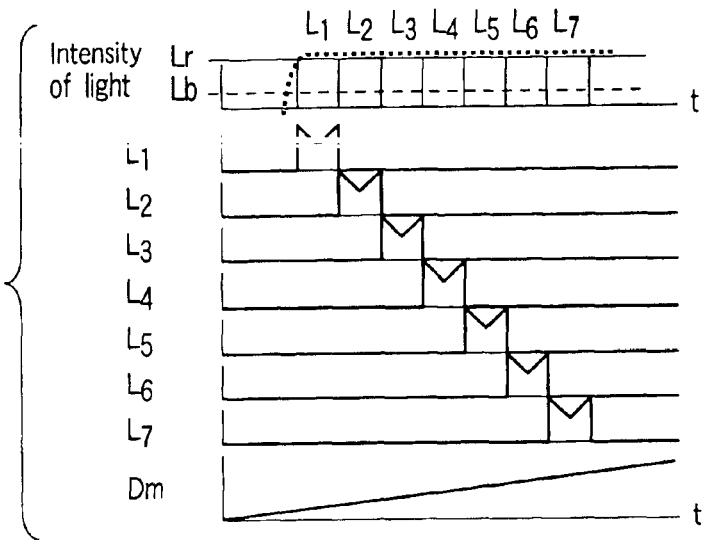
FIG. 22 shows the relationship between the operation distance and the timing of light emission and intensities of light emitted by the LED chips when the applied current to each LED chip is adjusted so that the intensity of light on the illuminated area becomes uniform in the configuration of FIG. 10.

In FIG. 22, Do, Dp and Ds are set as in the case of FIG. 10. Unlike the case of FIG. 11, however, the current applied to each LED chip is adjusted so that the intensity of light is made uniform over the illuminated area 34.

That is, the lighting control of LED chips as shown in FIG. 22 is performed in such a way that each LED chip is controlled to emit intenser light in positions away from the center of the light concentration area 35 than at the center and to turn off at the time when its trailing end exits out of the light concentration area. The lighting of the next LED chip is commenced at the same time the preceding LED chip is turned off.

Of course, the average light intensity Lr is increased above the intensity Lb at the time of normal lighting, providing bright illumination. Irrespective of LED switching, a constant intensity of light can be obtained on the illuminated area 34. The radiation performance of the LED is enhanced by turning it off during periods other than the lighting period. The control is therefore performed so as to avoid excess power consumption.

Figure 23:
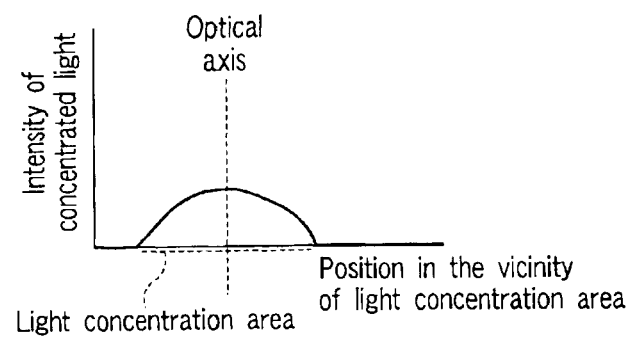
FIG. 23 shows the light concentration property of the light concentration area of the optical system.
Figure 24:
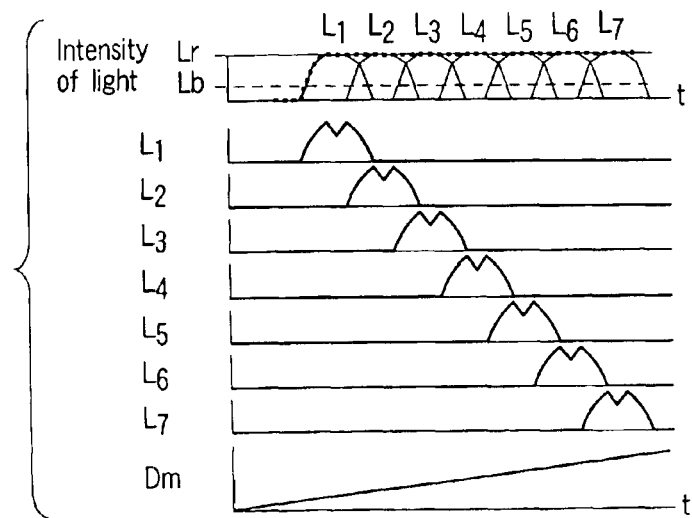
FIG. 24 is a diagram for use in explanation of light emission control considering the optical property shown in FIG. 23 and shows the relationship between the operation distance and the timing of light emission and intensities of light emitted by the LED chips.

Reference is next made to FIGS. 23 and 24 to describe the timing of lighting under the condition that Do, DP and Ds are set as in the case of FIG. 20 when, unlike the case of FIG. 21, the current applied to each LED chip is adjusted so that the intensity of light is made uniform over the illuminated area 34.

The optical system 33 in this case has such an optical property as shown in FIG. 23 which differs from that shown in FIG. 9. The timing diagram for lighting control taking such an optical property into account is illustrated in FIG. 24.

As shown in FIG. 23, the optical system in this case exhibits the maximum light concentration when each LED chip emits light at the center of the light concentration area 35. As the LED chip is moved away from the center, the light concentration decreases. At the ends of the light concentration area 35, the light concentration drops to substantially zero.

The lighting control of LED chips as shown in FIG. 24 is performed in such a way that the intensity of light emitted from each LED chip is increased as it is moved away from the center of the light concentration area 35 in order to compensate for loss of light caused by the optical system. In view of the optical property of the optical system of FIG. 23, the intensity of light from two LED chips is controlled so that the intensity of light on the illuminated area 34 is made uniform during the interval from when the leading end of the next LED chip enters into the light concentration area until it is covered in its entirety with the light concentration area.

At this point, during the interval when two LED chips are not fully covered with the light concentration area 35, instead of turning on both of them, only one of the LED chips may be turned on for light intensity control.

To this point, as the second embodiment of the present invention, we have discussed various lighting control and light intensity control schemes for brightly illuminating the illuminated area 34 by variously setting the size of the light concentration area, the pitch of LED chips and the LED size utilizing the aforementioned basic principle and the properties of the optical system.

[Third Embodiment]

A third embodiment of the present invention will be described next. The third embodiment is an application of the lighting control of the illumination apparatus based on the basic illumination principle according to the second embodiment to a projector display apparatus.

The projector display apparatus needs an illumination apparatus adapted to brightly illuminate the illuminated area 34 with concentrated or collimated light and not to illuminate other areas than the illuminated area.

To obtain good projected images, the projector display apparatus of the present embodiment includes a light selector control unit which provides timing control of the moving unit and the lighting unit, lighting control of LED chips for providing color projected images, and control of a light modulation device for switching light modulated states according to color image data R, G and B, which will be described below.

When liquid crystals are used as the light modulation device, illumination light to the light modulation device has a requirement that a total amount of light which is the integral of illumination light be kept constant during a frame period of image data in order to represent graduations correctly. As the light modulation device is known a pulse-width-modulation-based light modulation device which, like a digital micromirror device (DMD: the trade mark of Texas Instruments Corporation) as disclosed in U.S. Pat. No. 6,129,437, swings a mirror to two ON/OFF angles and controls the times of ON and OFF states within a fixed time to represent graduations. The projector display apparatus which uses such a pulse-width-modulation-based light modulation device needs an illumination apparatus which subjects R, G and B LED chips to lighting control during the modulation period corresponding to the abovedescribed fixed time to provide stable illumination with no variations with time.

Here, the modulation period and the frame period will be described in more detail. The frame period is the shortest period needed to represent input image data. The modulation period is a period during which, when the image is composed of R, G and B data each of 8 bits, a gradation value represented by 8 bits is represented. The modulation period will be described below by way of specific examples because it varies according to the configuration of the projector display apparatus.

In modulating color image data by means of one light modulation device, one frame period is divided into three subperiods to form R, G and B light modulated states. The light modulation period in this case corresponds to each of the three subperiods. For pulse width modulation, however, it is expected to subdivide each of the three subperiods into two subperiods and provide complete gradation representation in each of the two subperiods. In this case, the modulation period refers to each individual subperiod, not both of the subperiods.

A projector display apparatus equipped with an illumination system in which a light control member in a movement unit is adapted to rotate will be described hereinafter with reference to FIGS. 25 through 35.

FIG. 25 shows, in block diagram form, the configuration of the projector display apparatus. This apparatus includes an operating panel 38 having a power switch or start switch that starts the apparatus as instructed by a user and the configuration of the illumination apparatus shown in FIG. 7 except the operation start instruction unit 1. In place of this instruction unit, a display control unit 39 is provided which receives image data to output R, G and B data and outputs a modulation switching signal for switching the aforementioned modulated states. In addition, a light modulation device 34b, a light modulation device driver 40 and a projection optical system 41 are provided. The light modulation device 34b is adapted to modulate light output from an illumination unit corresponding to the aforementioned illumination apparatus in accordance with the image data. The light modulation device driver 40 responds to the R, G and B data and the modulation switching signal output from the display control unit 39 to drive the light modulation device 34b. The projection optical system 41 projects an optical image output from the light modulation device onto a large screen 42.

FIGS. 26A and 26B illustrate the configuration of the emission unit 3 in the projector display apparatus thus configured. The emission unit 3 has LED chips 25 mounted at regularly spaced intervals around a drum-shaped support member 43. In this example, 18 LED chips 25a–25r are arranged. The 18 LED chips are divided into sequentially arranged six sets of chips and, in each set, three LED chips corresponding to R, G and B are arranged in this order of colors. Each of the LED chips is turned on in sequence during one frame period.

The emitter movement unit 4 comprises a DC motor which allows the drum-shaped support member 43 to rotate smoothly. The optical system 33 is placed so as to direct light emerging from one light concentration area 35 to the light modulation device 34b placed in the illuminated area 34 of the illumination apparatus. The light gathering property of the light concentration area 35 is the same as that in FIG. 9.

Figure 27:
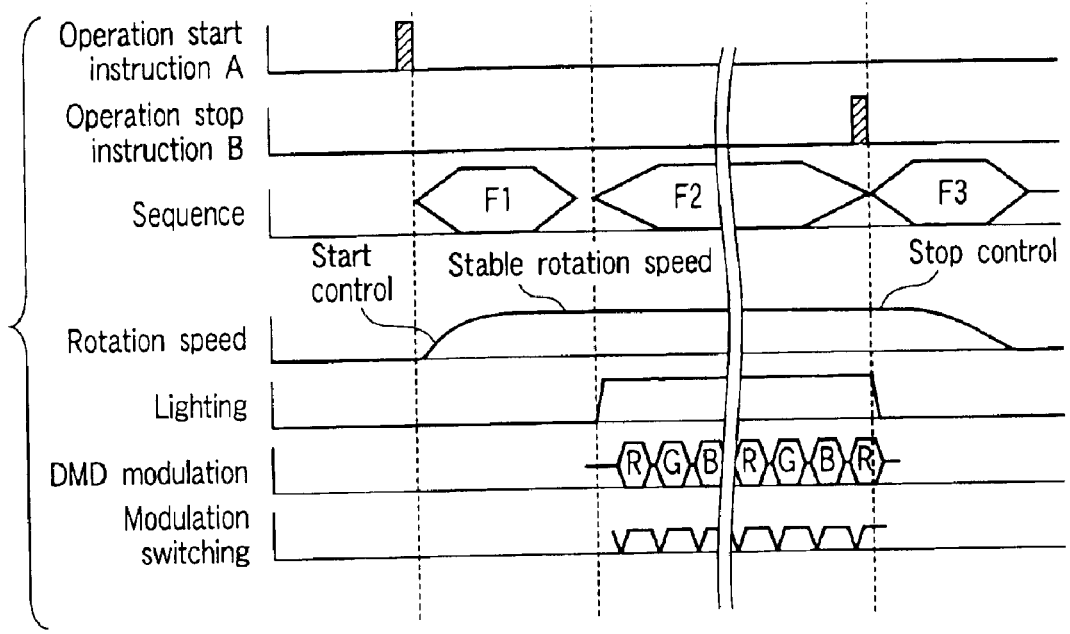
FIG. 27 is a timing diagram for use in explanation of the control procedure of starting and ending the operation of the projector display apparatus of the third embodiment.

FIG. 27 illustrates an outline of the sequence of the projector display apparatus from when a start signal (operation start instruction A) is generated by depression of the start switch (not shown) on the operating panel 38 until a stop signal (operation stop instruction B) is generated. This sequence is comprised of three periods F1, F2 and F3. The F1 period is the initialization period during which preparations are made for providing proper projected images. During this period, the motor is caused to rotate at a stable speed and the drum 43 and the light concentration area 35 of the optical system 33 are set in the reference position suitable for initiation of control. Further, electric circuits are initialized. During the F2 period, predetermined control is performed to obtain a projected image on the screen 42. During the F3 period, the motor is stopped and preparations are made for preventing the occurrence of various failures due to vibrations by carrying.

Figure 28:
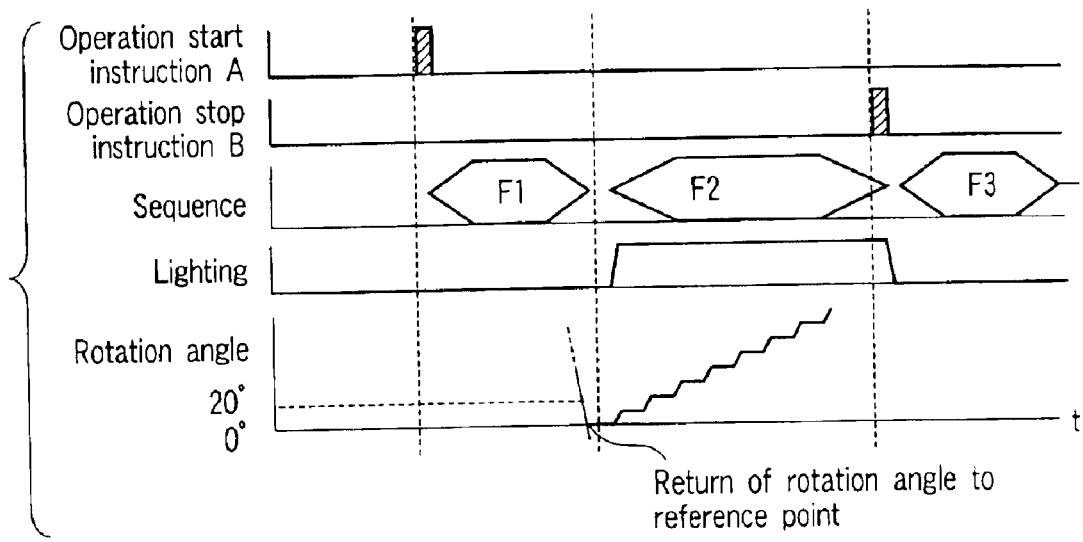
FIG. 28 is a timing diagram for use in explanation of the control procedure when a stepping motor is used in the emitter movement unit.

The sequence when the emitter movement unit 4 comprises a stepping motor is as depicted in FIG. 28. In this case as well, the F1 period is the period for initialization to obtain proper projected images. Here, the drum 43 and the light concentration area 35 of the optical system 33 are set in the reference position suitable for initiation of control. Further, electric circuits are initialized. During the F2 period, predetermined control is performed to obtain a projected image on the screen 42. During the F3 period, preparations are made for preventing the occurrence of various failures. With this apparatus, the F3 period is not particularly needed.

Figures 29, 30:
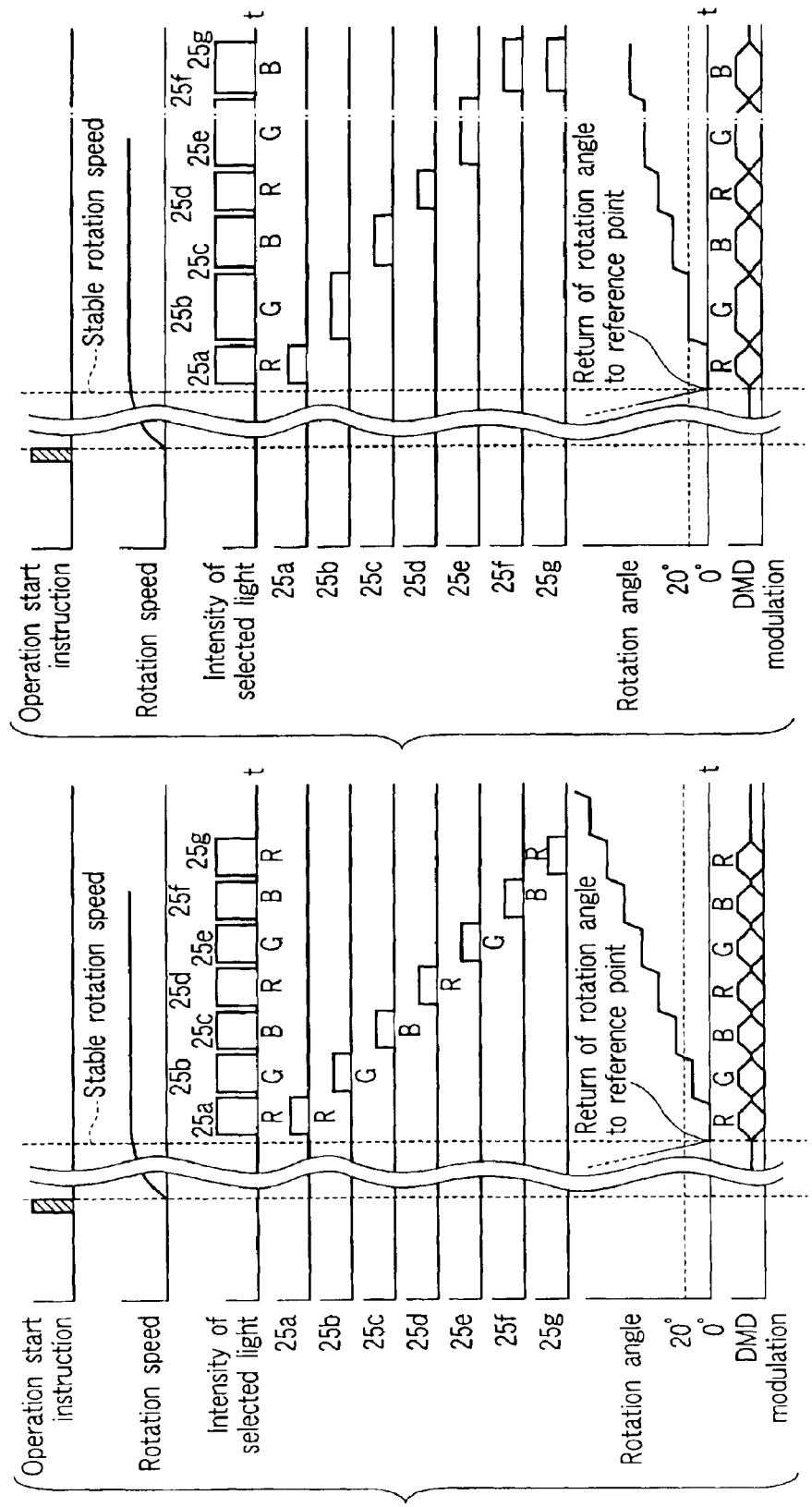
FIG. 29 shows the timing diagram of FIG. 28 in more detail.
FIG. 30 is a timing diagram when the light emission time is varied for each of R, G and B LED chips.

FIG. 29 is a more detailed timing diagram when the emitter movement unit 4 comprises a stepping motor as in the case of FIG. 28.

That is, as shown in FIG. 28, during the F1 period, the support member 43 is rotated until the reference position is reached where the LED chip 25a is covered with the light concentration area 35. At this point, the F1 period is terminated.

Next, the F2 period is initiated. During the F2 period, the stepping motor is rotated through 20 degrees every three milliseconds and, when the motor is stopped, the LED chip positioned in the light concentration area 35 is caused to emit light. Thus, the stepping operation of the stepping motor is repeated in succession every three milliseconds and the LED chip in the light concentration area 35 is lit in sync with the stepping operation, during which time DMD light modulation is complete. During that period, the DMD is placed in the light modulation state according to input R, G or B image data corresponding to the color of the lit LED chip. Thereby, a projected color image corresponding to input image data can be obtained on the screen 42.

In the above operation, the stepping operation is performed at regular intervals of three milliseconds, in which case the emission time is the same for all of R, G and B. To obtain color reproducibility of a color image, the emission time may be varied for each of R, G and B, which will be described next with reference to FIGS. 30 through 35. In obtaining a fixed intensity of emitted light by one-time continuous lighting of an LED chip, a phenomenon occurs by which the intensity of emitted light decays with time due to the generation of heat by continuous lighting. Provision against such a phenomenon will also be described.

FIG. 30 shows a timing diagram of lighting control when the emission time is varied for each of R, G and B. Here, the difference of FIG. 30 from FIG. 29 will be described. In this example, the emission times of R, G and B LED chips are set such that the G chip is the longest, followed by the B chip (i.e., R<B<G). The stopped time of stepping operation is controlled to vary with each of R, G and B in accordance with the set emission times of the R, G and B LED chips. The reason why the emission times of the R, G and B LED chips are varied is to compensate for differences in emission capability among the R, G and B LED chips and in emission capability in view of applied current and to thereby make a display with better color reproducibility. However, when the continuous emission time is long in one-time lighting, a phenomenon occurs by which the intensity of emitted light decays with time as the result of the LED chip being heated by applied current. In addition, because the R, G and B LED chips differ in emission time and performance, a problem arises in that the total intensity of emitted light varies.

Figure 31:
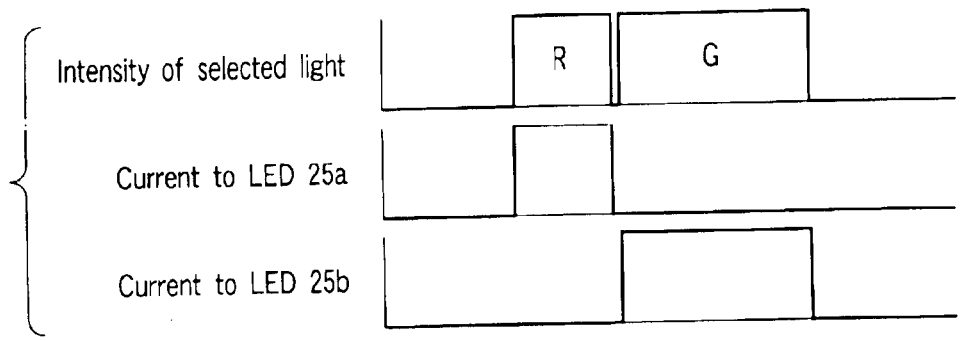
FIG. 31 shows an ideal relationship between the applied current to an LED chip and the intensity of emitted light.
Figure 32:
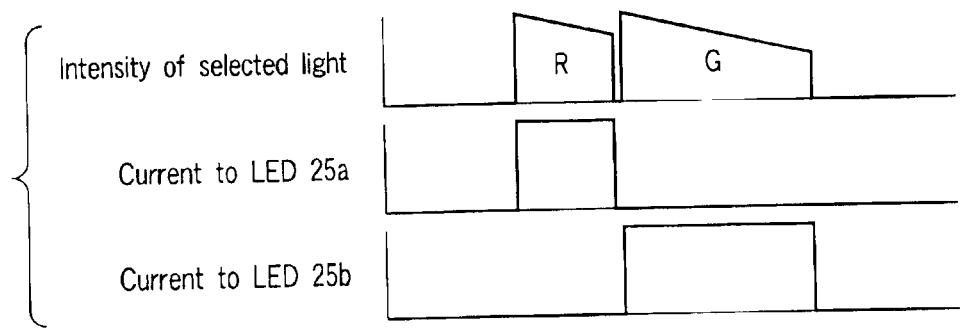
FIG. 32 shows a relationship between the applied current to an LED chip and a decay of the intensity of emitted light due to temperature.
Figure 33:
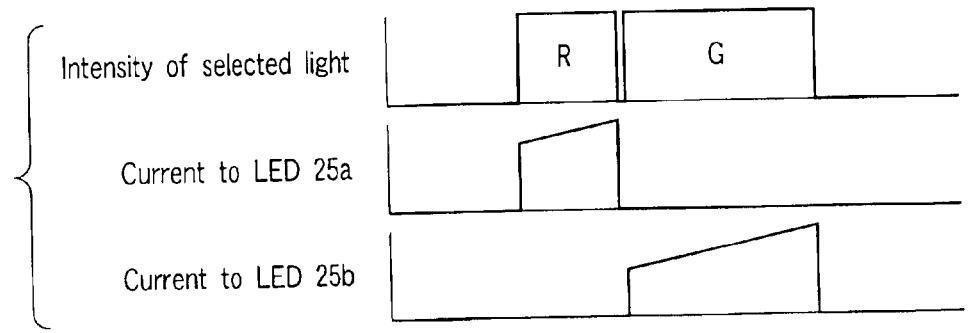
FIG. 33 is a diagram for use in explanation of applied current to an LED chip to compensate for loss in the intensity of emitted light due to temperature.

This point will be described in detail with reference to FIGS. 31, 32 and 33. FIG. 31 shows the ideal state in which the intensity of emitted light does not decay with time. FIG. 32 shows the state in which the intensity of emitted light actually decays with time. As can be seen from FIG. 32, the longer the emission time, the more the intensity of emitted light decays.

Emission control for solving such a problem will be described. FIG. 33 shows a timing diagram in which the amount of applied current to each LED chip is increased with time as provision for the above phenomenon. Thus, emission control is performed so that the intensity of emitted light is increased with time during one-time lighting of each LED chip. The emitter lighting control unit 6b includes a light intensity control unit 6b1 which allows the intensity of emitted light to remain unchanged.

Figure 34:
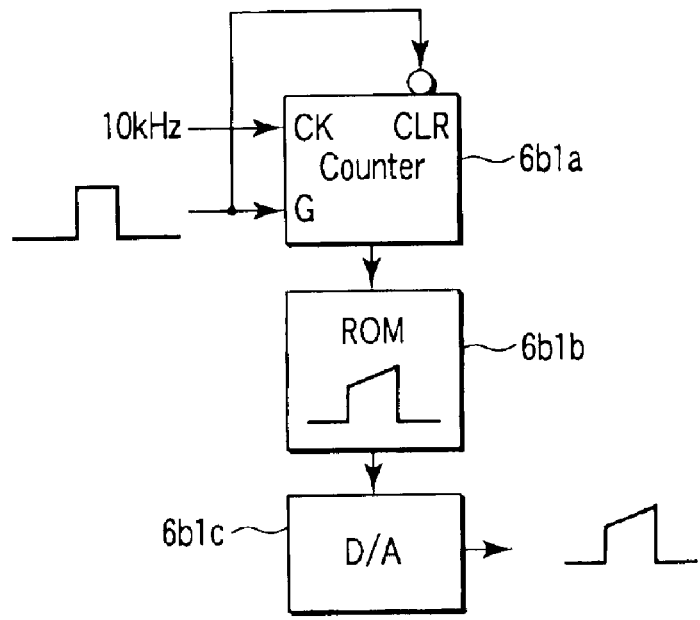
FIG. 34 shows an arrangement of a light intensity control unit for making the intensity of emitted light constant.

FIG. 34 shows the arrangement of the light intensity control unit 6b1, which comprises a counter 6b1a, a ROM 6b1b, and a D/A converter 6b1c. The ROM 6b1b is stored with waveshape data reflecting the amount by which the intensity of emitted light decays during the emission time of an LED chip. The counter 6b1a has its clock input connected to receive a 10-KHz clock and its gate input connected to receive a lighting pulse signal which is at a high level during the lighting time. Further, the counter has its clear terminal connected to receive the lighting pulse signal. The counter is reset when the pulse signal goes low and count enabled when the pulse signal goes high. While the pulse signal is at high level, the count in the counter 6b1a is incremented by the clock. As a result, the ROM address corresponding to the count in the counter is incremented and the waveshape data is read out of the ROM. The waveshape data is converted by the D/A converter 6b1c into an analog signal, which in turn is applied to the corresponding emitter drive unit 7 in order to control the applied current to the corresponding LED chip.

Figure 35:
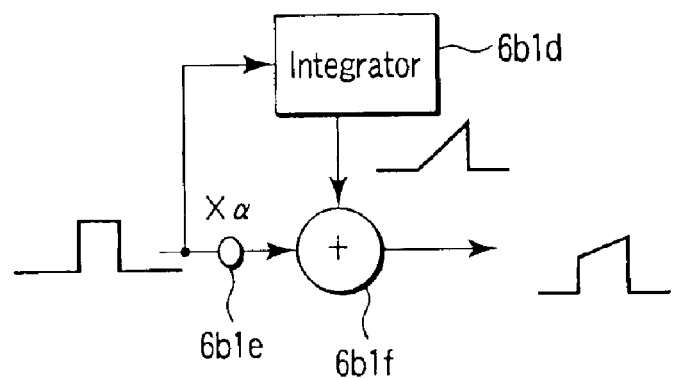
FIG. 35 shows another arrangement of the light intensity control unit for making the intensity of emitted light constant.

FIG. 35 shows another arrangement of the light intensity control unit 6b1, which comprises an integrator 6b1d, a multiplier 6b1e, and an adder 6b1f. In this arrangement, such an ideal pulse as shown in FIG. 31 is integrated in the integrator while at the same time it is multiplied by α in the multiplier 6b1e. The outputs of the integrator 6b1d and the multiplier 6b1e are added together in the adder 6b1f, thus allowing the same waveform as with FIG. 34 to be produced. Thereby, a fixed intensity of emitted light can be secured readily without any loss in the intensity of emitted light with time.

In particular, the example of FIG. 34 allows complicated emission control as depicted in FIGS. 22 and 24 to be implemented simply by storing the control waveforms into the ROM in advance. The ROM may be replaced with a rewritable RAM. Of course, it is allowed to detect the intensity of emitted light and control it according to the detected result.

Figures 36A, 36B:
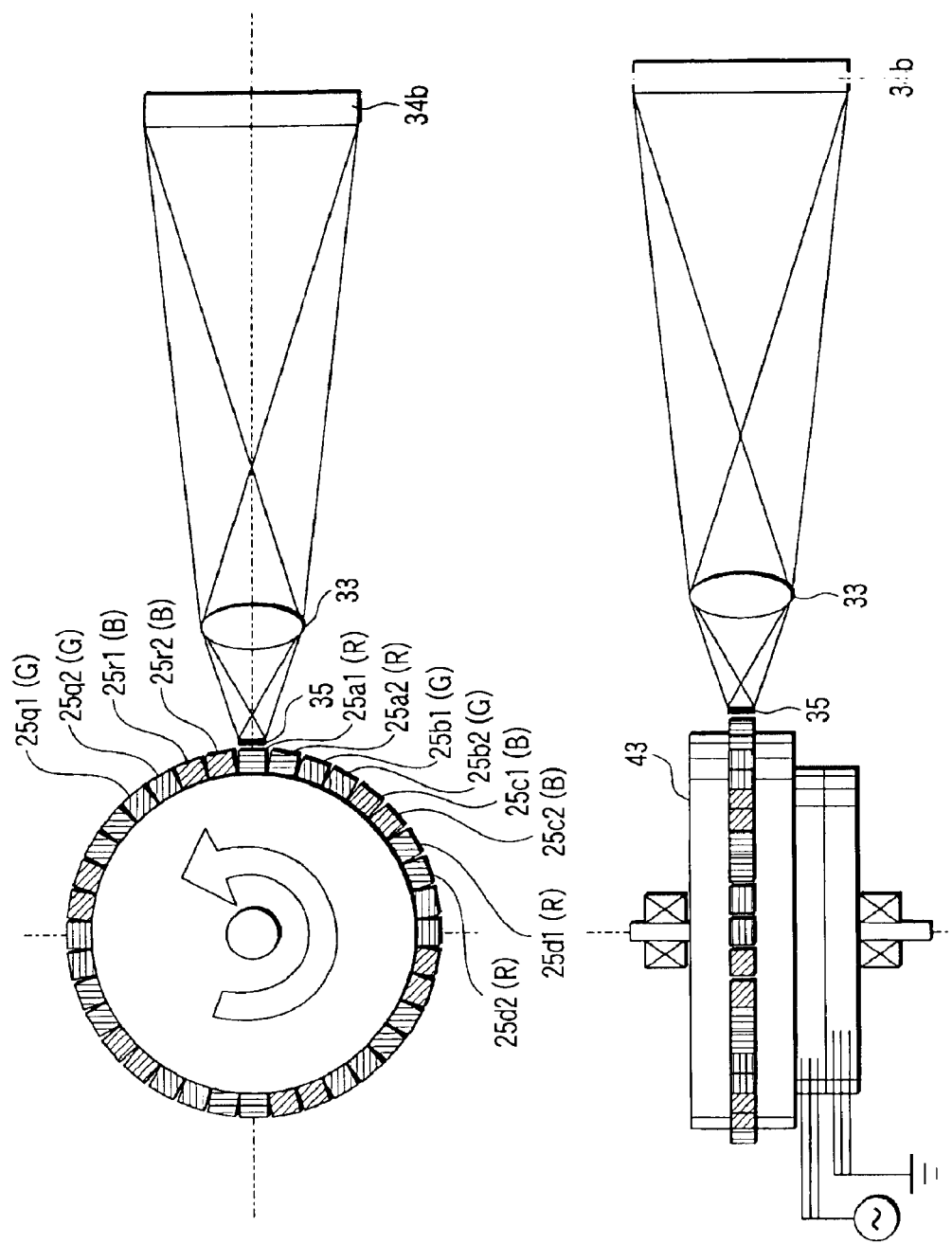
FIG. 36A is a front view illustrating another configuration of the light emission unit in the projector display apparatus of the third embodiment.
FIG. 36B is a plan view of the light emission unit in FIG. 36A.

FIGS. 36A and 36B show another configuration of the emission unit 3 of the projector display apparatus of the present embodiment. In this configuration, unlike the configuration of FIGS. 26A and 26B, the LED chips (25a1(R), 25a2(R), 25b1(G), 25b2(G), 25c1(B), 25c2(B), 25a1(R), 25a2(R), etc.) are arranged in the order of R, R, G, G, B, B, R, R, etc. A plurality of LED chips is lit for each of R, G and B during one frame period.

Figure 37:
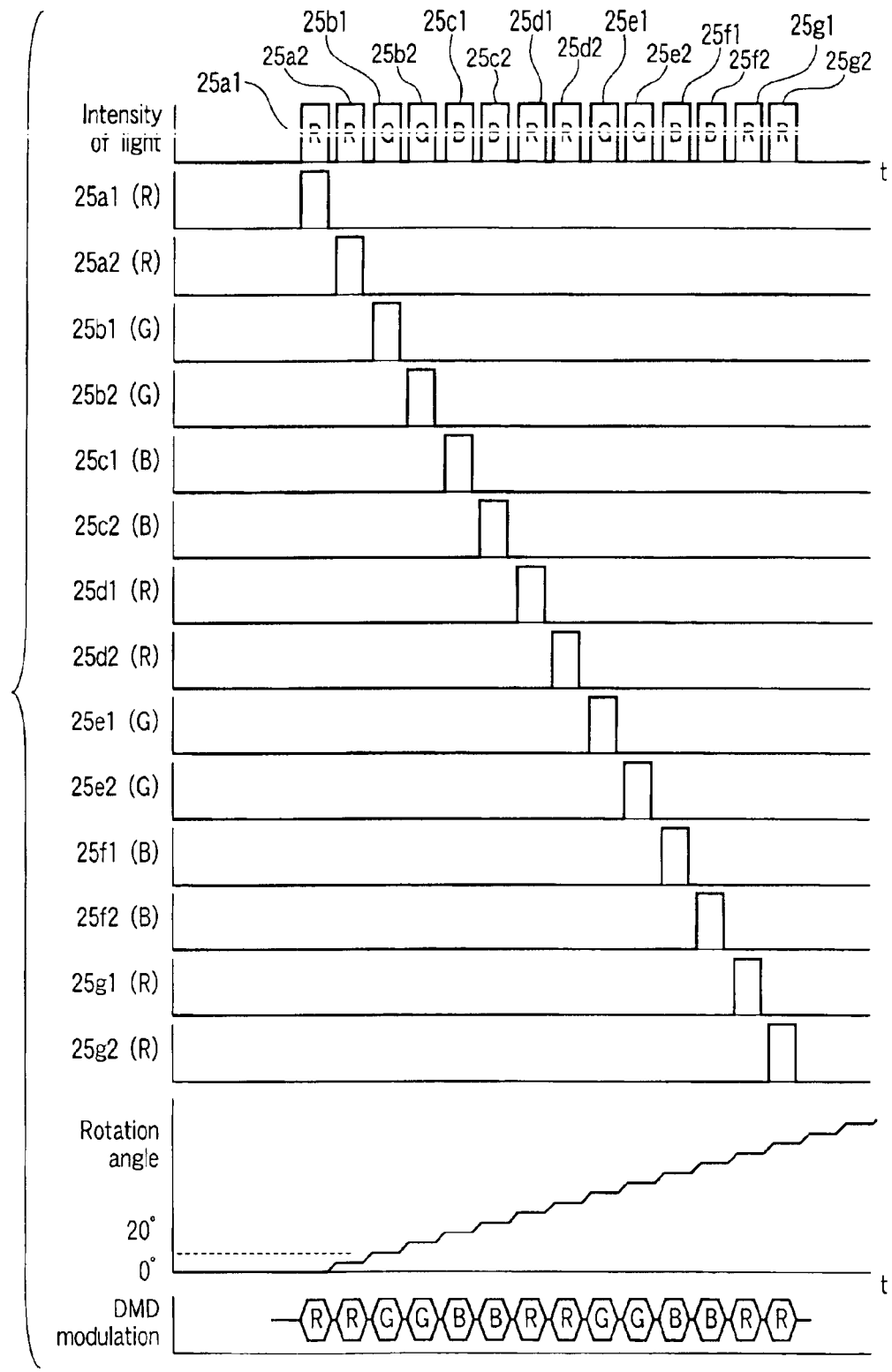
FIG. 37 is a timing diagram illustrating the times of light emission in the configuration of FIGS. 36A and 36B.

Here, a description is given of the case where the number of LEDs that are lit is two with reference to FIG. 37. In this case, the stepping motor as the emitter movement unit 4 is rotated through 10 degrees every 1.5 milliseconds and, when the motor is stopped, the LED chip positioned in the light concentration area 35 is caused to emit light. Although one frame period is 9 milliseconds as in the case of FIG. 29, the stepping operation is repeated in succession at an interval of 1.5 milliseconds which is ½ of that in FIG. 29. The LED chip in the light concentration area 35 is lit in sync with the stepping operation, during which time DMD light modulation is completed. During that period, the DMD is placed in the light modulation state according to input R, G or B image data corresponding to the color of the lit LED chip.

In this case, the lighting time of each LED chip is shorter than in the case of FIG. 29 and the emission period at which the same chip is lit is 540 milliseconds as in the case of FIG. 29. The lighting time relative to the emission period is made shorter, allowing the avoidance of generation of heat due to light emission. Thus, the current applied to each LED chip can be increased above the case of FIG. 29, thus allowing a much brighter projected image than in the case of FIG. 29 to be provided.

Although the preferred embodiments of the present invention have been disclosed and described, the present invention may be practiced or embodied in still other ways without departing from the scope and spirit thereof.

For example, other known techniques can be applied to the mechanism for causing each individual light source to emit light, the mechanism for scanning the light sources, and the imaging optical system.

For example, the LED chip support member is not limited to the form of a plate or drum as described above. The light control member operated by the movement unit is not limited to a support member on which LED chips are mounted. For example, it is allowed to form the LED chip support member in the shape of a drum, cause it to remain stationary, arrange LED chips on the inner surface of the drum, and operate the optical system so that the light concentration area moves over the LED chips. The optical system is not limited to lenses, but may be mirrors, prisms or fibers.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination apparatus which directs light from a light source to an illuminated area, comprising:
a plurality of light emitters as the light source;
a lighting unit configured to cause the light emitters to emit light so that the intensities of light emitted by them can be adjusted;
an optical system configured to, of light emitted by the emitters, direct light passed through its light concentration area to the illuminated area;
a light control member configured to perform at least one of changing the path of light from the emitters to be directed to the illuminated area and moving of the light emitters;
a movement unit configured to allow the light control member to operate; and
a light selector control unit configured to control at least one of the movement unit and the lighting unit so as to select light to be directed to the illuminated area from light of the emitters,
wherein the light selector control unit controls the lighting unit to cause an emitter to emit light when it is positioned in the vicinity of the light concentration area by the operation of the light control member.

2. The apparatus according to claim 1, wherein the light selector control unit controls the lighting unit so that, when an emitter does not face the light concentration area by the operation of the light control member, it emits light the intensity of which is weaker than when it faces the light concentration area.

3. The apparatus according to claim 2, wherein the light selector control unit controls the lighting unit so as to turn off an emitter while it does not face the light concentration area by the operation of the light control member.

4. The apparatus according to claim 1, wherein the light selector control unit controls the lighting unit so as to cause an emitter to emit light continuously while it faces the light concentration area.

5. The apparatus according to claim 4, wherein the light selector control unit controls the lighting unit so as to vary the intensity of light emitted by the emitter to be emitted during continuous emission.

6. The apparatus according to claim 5, wherein the light selector control unit controls the lighting unit so as to increase the magnitude of a current applied to the emitter with time during continuous emission.

7. The apparatus according to claim 4, wherein the light selector control unit controls the lighting unit so as to cause an emitter to emit light only while its light emitting surface is covered in its entirety with the light concentration area.

8. The apparatus according to claim 1, wherein the light selector control unit controls the lighting unit so as to cause a plurality of emitters which are positioned in the vicinity of the light concentration area to emit light simultaneously.

9. The apparatus according to claim 1, wherein the light selector control unit controls the following two states: the transient state in which at least one of the movement unit and the lighting unit is controlled in order to allow a selection from the emitters; and the stable state in which a selection can be made from the emitters, and wherein the stable state is the one in which the illuminated area is illuminated.

10. A projector display apparatus comprising:
an illumination apparatus which directs light from a light source to an illuminated area including:
a plurality of light emitters as the light source;
a lighting unit configured to cause the light emitters to emit light so that the intensities of light emitted by them can be adjusted;
an optical system configured to, of light emitted by the emitters, direct light passed through its light concentration area to the illuminated area;
a light control member configured to perform at least one of changing the path of light from the emitters to be directed to the illuminated area and moving of the light emitters;
a movement unit configured to allow the light control member to operate; and
a light selector control unit configured to control at least one of the movement unit and the lighting unit so as to select light to be directed to the illuminated area from light of the emitters,
wherein the light selector control unit controls the lighting unit to cause an emitter to emit light when it is positioned in the vicinity of the light concentration area by the operation of the light control member;
a light modulation device placed in the illuminated area configured to light-modulate light from the illumination apparatus according to image data;
a projection unit configured to project light modulated by the light modulation device; and
a light modulation device control unit configured to switch the light modulated states of the light modulation device,
wherein the light selector control unit of the illumination apparatus selects an emitter to emit light in synchronism with the switching of the light modulated states of the light modulation device.

11. The apparatus according to claim 10, wherein the light selector control unit in the illumination apparatus does not change a selected emitter during a modulation period from a point of time of switching to the next point of time of switching.

12. The apparatus according to claim 11, wherein the light modulation device is of a pulse width modulation type which represents the light modulated states according to image data in terms of one period of the modulation period.

13. The apparatus according to claim 10, wherein
the light modulation device control unit represents the image data in one frame period, and
the light selector control unit in the illumination apparatus selectively turns on a fixed number of emitters during the frame period.

14. The apparatus according to claim 13, wherein the light modulation device is of a pulse width modulation type which represents the light modulated states according to image data in terms of one period of the modulation period.

15. The apparatus according to claim 10, wherein
the movement unit in the illumination apparatus is configured to repeat operation and stop, and
the light selector control unit in the illumination apparatus selects an emitter position in the light concentration area when the movement unit is placed in the stopped state.

16. The apparatus according to claim 10, wherein the light selector control unit in the illumination apparatus controls the lighting unit in the illumination apparatus so that, when an emitter does not face the light concentration area by the operation of the light control member, it emits light the intensity of which is weaker than when it faces the light concentration area.

17. The apparatus according to claim 16, wherein the light selector control unit in the illumination apparatus controls the lighting unit in the illumination apparatus so as to turn off an emitter while it does not face the light concentration area by the operation of the light control member.

18. The apparatus according to claim 10, wherein the light selector control unit in the illumination apparatus controls the lighting unit in the illumination apparatus so as to cause an emitter to emit light continuously while it faces the light concentration area.

19. The apparatus according to claim 18, wherein the light selector control unit in the illumination apparatus controls the lighting unit in the illumination apparatus so as to vary the intensity of light emitted by the emitter to be emitted during continuous emission.

20. The apparatus according to claim 19, wherein the light selector control unit in the illumination apparatus controls the lighting unit in the illumination apparatus so as to increase the magnitude of a current applied to the emitter with time during continuous emission.

21. The apparatus according to claim 18, wherein the light selector control unit in the illumination apparatus controls the lighting unit in the illumination apparatus so as to cause an emitter to emit light only while its light emitting surface is covered in its entirety with the light concentration area.

22. The apparatus according to claim 10, wherein the light selector control unit in the illumination apparatus controls the lighting unit in the illumination apparatus so as to cause a plurality of emitters which are positioned in the vicinity of the light concentration area to emit light simultaneously.

23. The apparatus according to claim 10, wherein the light selector control unit in the illumination apparatus controls the following two states: the transient state in which at least one of the movement unit and the lighting unit in the illumination apparatus is controlled in order to allow a selection from the emitters; and the stable state in which a selection can be made from the emitters, and the projector display apparatus is allowed to make a projector display in the stable state.

24. An illumination apparatus which directs light from a light source to an illuminated area, comprising:

a plurality of light emitters as the light source;

lighting means for causing the light emitters to emit light so that the intensities of light emitted by them can be adjusted;

optical means for, of light emitted by the emitters, directing light passed through its light concentration area to the illuminated area;

a light control member for performing at least one of changing the path of light from the emitters to be directed to the illuminated area and moving of the light emitters;

movement means for allowing the light control member to operate; and light selector control means for controlling at least one of the movement means and the lighting means so as to select light to be directed to the illuminated area from light of the emitters, wherein the light selector control means controls the lighting means to cause an emitter to emit light when it is positioned in the vicinity of the light concentration area by the operation of the light control member.

25. A projector display apparatus comprising:

an illumination apparatus which directs light from a light source to an illuminated area including:

a plurality of light emitters as the light source;

lighting means for causing the light emitters to emit light so that the intensities of light emitted by them can be adjusted;

optical means for, of light emitted by the emitters, directing light passed through its light concentration area to the illuminated area;

a light control member for performing at least one of changing the path of light from the emitters to be directed to the illuminated area and moving of the light emitters;

movement means for allowing the light control member to operate; and light selector control means for controlling at least one of the movement means and the lighting means so as to select light to be directed to the illuminated area from light of the emitters, wherein the light selector control means controls the lighting means to cause an emitter to emit light when it is positioned in the vicinity of the light concentration area by the operation of the light control member;

a light modulation device placed in the illuminated area for light-modulating light from the illumination apparatus according to image data;

projection means for projecting light modulated by the light modulation device; and light modulation device control means for switching the light modulated states of the light modulation device, wherein the light selector control means of the illumination apparatus selects an emitter to emit light in synchronism with the switching of the light modulated states of the light modulation device.

* * * * *